United States Patent

Osborne

(10) Patent No.: US 9,772,465 B2
(45) Date of Patent: Sep. 26, 2017

(54) METHODS AND DEVICES FOR THIN CAMERA FOCUSING ALIGNMENT

(71) Applicant: QUALCOMM Incorporated, San Diego, CA (US)

(72) Inventor: Thomas Wesley Osborne, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 152 days.

(21) Appl. No.: 14/731,303

(22) Filed: Jun. 4, 2015

(65) Prior Publication Data

US 2016/0356978 A1 Dec. 8, 2016

(51) Int. Cl.
| | |
|---|---|
| G02B 7/00 | (2006.01) |
| G02B 27/62 | (2006.01) |
| H04N 5/225 | (2006.01) |
| H04N 17/00 | (2006.01) |
| G02B 7/02 | (2006.01) |
| G06T 7/00 | (2017.01) |

(52) U.S. Cl.
CPC ............. *G02B 7/004* (2013.01); *G02B 7/025* (2013.01); *G02B 27/62* (2013.01); *G06T 7/0004* (2013.01); *H04N 5/2254* (2013.01); *H04N 17/002* (2013.01); *G06T 2207/10004* (2013.01)

(58) Field of Classification Search
CPC ................... H04N 5/23212; G06T 7/0004
See application file for complete search history.

(56) References Cited

U.S. PATENT DOCUMENTS

| | | | |
|---|---|---|---|
| 7,337,552 | B2 | 3/2008 | Smith et al. |
| 8,624,985 | B2 | 1/2014 | Vinogradov et al. |
| 2007/0268720 | A1 | 11/2007 | Rowe et al. |
| 2008/0316350 | A1 | 12/2008 | Gottwald et al. |

(Continued)

FOREIGN PATENT DOCUMENTS

| | | |
|---|---|---|
| EP | 1463342 A1 | 9/2004 |
| WO | WO-2012037909 A2 | 3/2012 |

OTHER PUBLICATIONS

International Search Report and Written Opinion—PCT/US2016/032122—ISA/EPO—dated Aug. 3, 2016.

(Continued)

*Primary Examiner* — Chan Park
*Assistant Examiner* — Mai Tran

(57) ABSTRACT

Methods and devices are disclosed for aligning a lens assembly and a sensor assembly of an optical system during assembly of the optical system. For example, one method includes positioning the sensor assembly, having at least an image sensor, at the focal plane of the lens assembly and directing light through an alignment optic and lens assembly onto the image sensor. The method further includes producing multiple images from the light received through the lens assembly and alignment optic, the images having multiple alignment features based on the light received through the alignment optic, and the alignment features having multiple sections. The method then measures at least one performance indicator corresponding to each of multiple sections, and adjusts the position of the image sensor based on an optimization of the performance indicators, while the sensor assembly is being attached to the lens assembly.

29 Claims, 14 Drawing Sheets

(56) References Cited

U.S. PATENT DOCUMENTS

| | | | |
|---|---|---|---|
| 2013/0038937 A1 | 2/2013 | Boreman et al. | |
| 2015/0009394 A1* | 1/2015 | Juhola | H04N 5/23212 |
| | | | 348/349 |
| 2015/0293330 A1* | 10/2015 | Gutierrez | G02B 13/0015 |
| | | | 359/811 |

OTHER PUBLICATIONS

Burvall A., et al., "Telephoto Axicon," Proceedings of SPIE, 2005, vol. 5962, pp. 596213-1 to 596213-8.

* cited by examiner

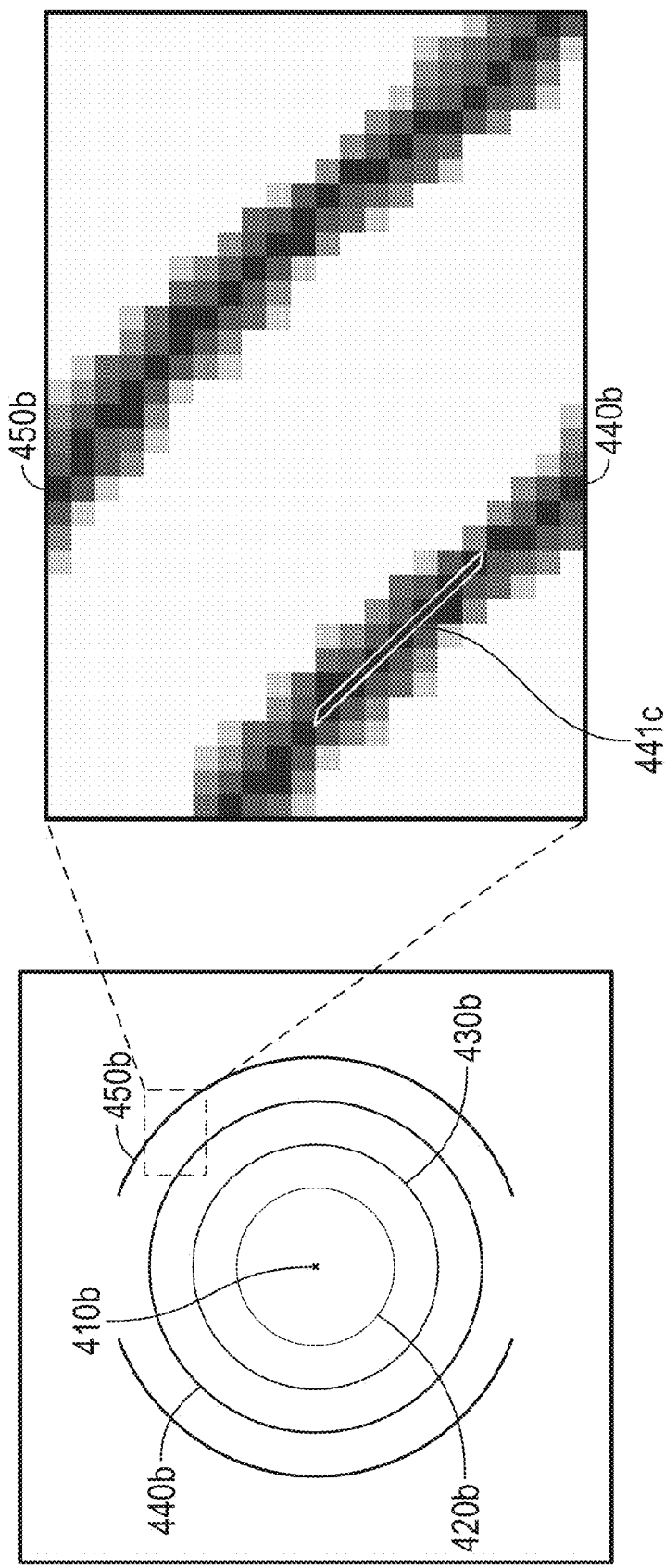

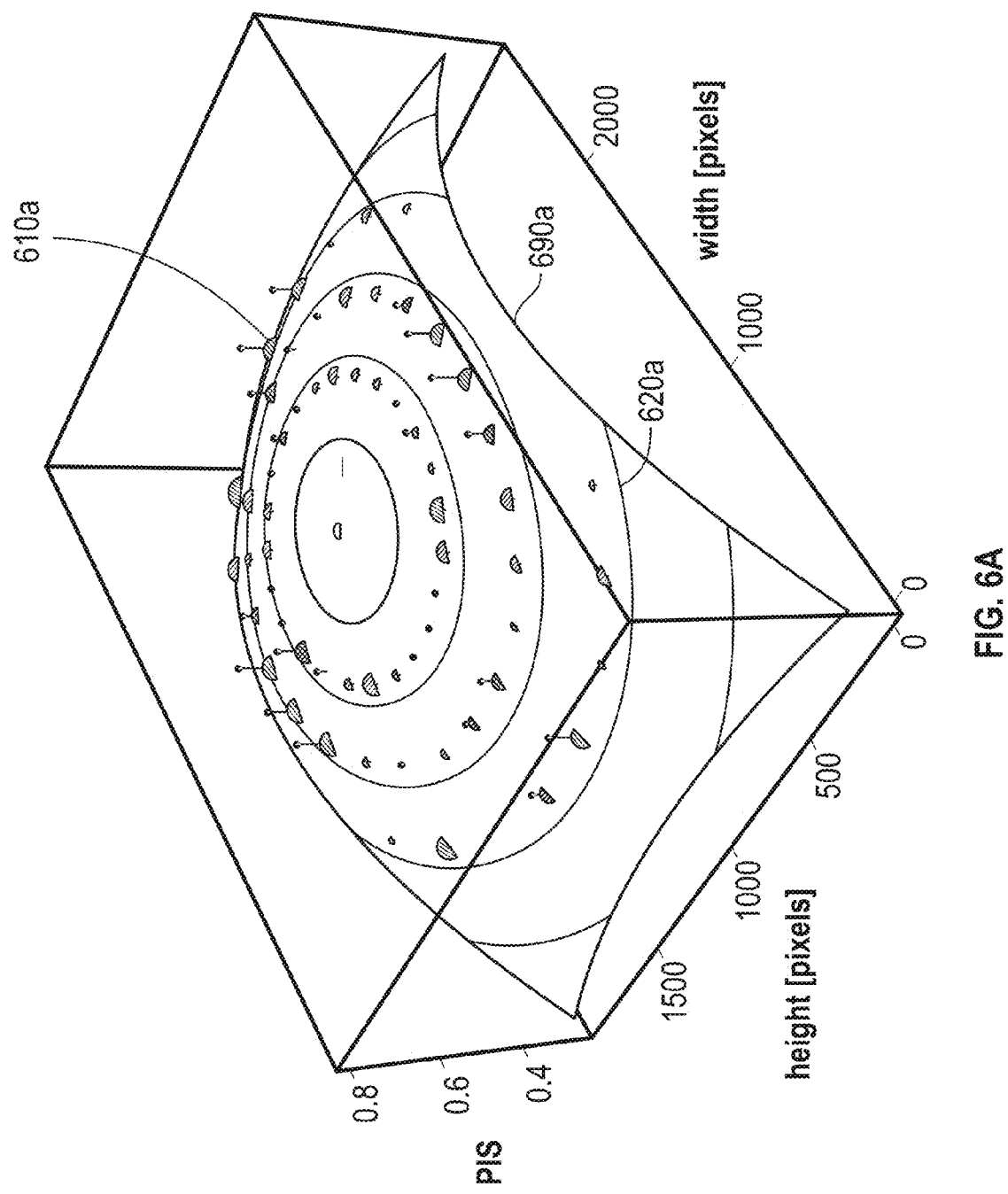

METHODS AND DEVICES FOR THIN CAMERA FOCUSING ALIGNMENT

TECHNICAL FIELD

One aspect of the present embodiments relates to imaging devices, and in particular, to systems and methods of aligning an image sensor in an imaging device during manufacture of the imaging device.

BACKGROUND

Many mobile devices, such as mobile phones and tablet computing devices, include cameras that may be operated by a user to capture still and/or video images. Because such mobile devices are typically designed to be relatively thin, it can be important to design the cameras or imaging system to be as thin as possible in order to maintain a low-profile mobile device. One of the limiting factors as to how thin a mobile camera, imaging system or device can be constructed is the camera, as traditional mobile device cameras have a number of optical elements, e.g., a lens assembly and image sensor.

As imaging devices have become thinner and resolution of the camera has improved, the number of pixels designed into the image sensors has increased and the pixel pitch as decreased. For example, some current image sensors used in thin imaging devices include a 1 µm pixel pitch. However, image sensors are being developed toward submicron pixels. Small pixels enable the imaging device to capture images having more resolution, but the lens system must be able to pass image information that is out to the Nyquist Sample rate of the image sensor. This can be difficult to achieve for pixels that are 1.5 µm or smaller, because as the pixels become smaller the Nyquist Sample rate increases and the image sensor is susceptible to increased noise.

One approach has been to use an ultra-high resolution lens assembly, having a narrow field-of-view ("FOV") in imaging devices to focus a scene onto an imaging sensor having small pixels. However, aligning an image sensor with an ultra-high resolution lens can be extremely difficult. Minor translational (e.g., X, Y, and Z linear directions) and rotational (e.g., tilt such as pitch, yaw and roll) misalignments can impact the overall performance of the imaging device. For a thin imaging device an important step in minimizing alignment errors is to glue the lens assembly directly to the sensor assembly that includes the image sensor. The direct gluing of the image sensor to the sensor cover glass is difficult to do without causing alignment errors during the gluing process. Such alignment concerns include ensuring the image sensor is positioned at the focal plane of the lens system and is aligned perpendicular to the optical axis of the lens system and at the correct angle thereby avoiding misalignment created by tilt or roll in the focal plane. Therefore it is important to use active alignment methods, where the imaging device's performance is actively measured during manufacture.

SUMMARY

The systems, methods, and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein, including the summary described below.

Some embodiments may include a method for aligning an optical system during assembly, the optical system having at least a lens assembly and a sensor assembly. This method may include positioning the sensor assembly, having at least an image sensor, at the focal plane of the lens assembly, directing light through an alignment optic and lens assembly onto the image sensor, and producing multiple images from the light received through the lens assembly and alignment optic. Each of the multiple images having multiple alignment features based on the light received through the alignment optic, and the alignment features having multiple sections. In some embodiments, the sensor assembly includes the image sensor and a sensor cover and at least one surface of the lens assembly is attached to the sensor cover. In some embodiments, the light directed through the lens assembly and alignment optic is collimated light. In one embodiment, the alignment optic is a multi-zone flat top axicon lens. In one embodiment, each of the alignment images corresponds to a different position of the image sensor relative to the lens assembly The method further includes measuring at least one performance indicator corresponding to each of the multiple sections and adjusting the position of the image sensor based on an optimization of the performance indicators, while the sensor assembly is being attached to the lens assembly. In some embodiments, the performance indicator is a sharpness value corresponding to the intensity of the light along the sections of the alignment features detected by a portion of the image sensor.

In some embodiments, the light is segmented by the alignment optic into alignment features depicted as multiple concentric rings. Each alignment feature corresponds to at least one ring of the multiple concentric rings. In some embodiments, the multiple concentric rings include at least a first concentric ring and at least a second concentric ring, where the first concentric ring has a radius that is smaller than the second concentric ring. In some embodiments, the performance indicators corresponding to sections of the first concentric ring relate to the translational position of the sensor assembly along the optical axis. While, the performance indicators corresponding to sections of at least one concentric ring can relate to the rotational position of the image sensor in relation to the focal plane of the lens assembly.

In one embodiment, the adjusting the sensor assembly can also include maximizing the at least one performance indicator based on a translational position adjustment of the sensor assembly. The performance indicator is maximized when the performance indicator of at all sections of the first alignment feature are at a maximum.

In another embodiment, the adjusting the sensor assembly can also include balancing the at least one performance indicator based on the rotational position adjustment of the sensor assembly. The performance indicator is balanced when the at least one performance indicator of at least a first section of at least one alignment feature is substantially similar to the at least one performance indicator of at least a second section of the same alignment feature.

In still another embodiment, the adjusting the sensor assembly can also include optimizing the at least one performance indicator based on the rotational position adjustment of the sensor assembly. The at least one performance indicator is optimized when the at least one performance indicator of the at least one section of at least one alignment feature is substantially similar to the performance indicator of the sections of alignment features positioned within the at least one alignment feature, and vice versa.

According to another aspect, a device for aligning an optical system, having a lens assembly and a sensor assembly, is disclosed. The device includes a lens assembly holder, configured to move the lens assembly and support an alignment optic, wherein the alignment optic is orientated along the optical axis of the lens assembly; a sensor assembly holder, configured to move the sensor assembly, the sensor assembly having an image sensor; an attachment mechanism, configured to attach the lens assembly to the sensor assembly when substantially aligned with respect to each other; a light source, configured to direct light through the alignment optic and lens assembly onto the image sensor; a processor, operably coupled to the lens assembly holder and sensor assembly holder; and a memory component, operably coupled to the processor. In some embodiments, the sensor assembly includes the image sensor and a sensor cover and at least one surface of the lens assembly is attached to the sensor cover. In another embodiment, the light directed through the lens assembly and alignment optic is collimated light. In one embodiment, the alignment optic is a multi-zone flat top axicon lens.

The processor and the memory component are collectively configured to capture multiple images from the light received by the sensor assembly through the lens assembly and alignment optic. The processor and memory component are further configured to determine multiple alignment features based on the light received through the alignment optic and determine multiple substantially linear sections for each alignment feature. In some embodiments, each of the multiple alignment images corresponds to a different position of the image sensor relative to the lens assembly. The processor and memory component are also configured to measure at least one performance indicator corresponding to each of the multiple substantially linear sections; and determine an adjustment of the sensor assembly, relative to the lens assembly, based on optimizing the performance indicators. In some embodiments, the performance indicator is a sharpness value corresponding to the intensity of the light along the substantially linear sections of the alignment features detected by a portion of the image sensor.

In some embodiments, the light is segmented by the alignment optic into alignment features depicted as multiple concentric rings. Each alignment feature corresponds to at least one ring of the multiple concentric rings. In at least one embodiment, the multiple concentric rings includes at least an first concentric ring and at least a second concentric ring, where the first concentric ring has a radius that is smaller than the second concentric ring. In another embodiment, the performance indicators corresponding to substantially linear sections of the first concentric ring relate to the translational position of the sensor assembly along the optical axis. In some embodiments, the performance indicators corresponding to substantially linear sections of at least one concentric ring relate to the rotational position of the image sensor in relation to the focal plane of the lens assembly.

In some embodiments, the sensor assembly holder is further configured to adjust the position of the sensor assembly, and maximize the at least one performance indicator based on a translational position adjustment of the sensor assembly. The performance indicator is maximized when the performance indicator of at all substantially linear sections of the first alignment feature are at a maximum. In another embodiment, the lens assembly holder is further configured to adjust the position of the sensor assembly, and maximize the at least one performance indicator based on a translational position adjustment of the sensor assembly. The performance indicator is maximized when the performance indicator of at all substantially linear sections of the first alignment feature are at a maximum. In still another embodiment, the sensor assembly holder is further configured to adjust the position of the sensor assembly, and balance the at least one performance indicator based on the rotational position adjustment of the sensor assembly. The performance indicator is balanced when the at least one performance indicator of at least a first substantially linear section of at least one alignment feature is substantially similar to the at least one performance indicator of at least a second substantially linear section of the same alignment feature. In still another embodiment, the sensor assembly holder is further configured to adjust the position of the sensor assembly, and optimize the at least one performance indicator based on the rotational position adjustment of the sensor assembly. The at least one performance indicator is optimized when the at least one performance indicator of the at least one substantially linear section of at least one alignment feature is substantially similar to the performance indicator of the substantially linear sections of alignment features positioned within the at least one alignment feature, and vice versa.

In some embodiments, the memory component includes multiple modules including instructions that, when executed, configure to processor to actively align the optical system. In one non-limiting embodiment, the memory component can include a capture control module, a feature determination module, a performance determination module, and an optimization module.

According to another aspect, a device for aligning an optical system, having a lens assembly and a sensor assembly, is disclosed. The device includes a means for capturing a plurality of images from the light received by the sensor assembly through the lens assembly and alignment optic, a means for detecting multiple alignment features based on the light received through the alignment optic, a means for determining multiple substantially linear sections for each alignment feature, a means for measuring at least one performance indicator corresponding to each of multiple substantially linear sections; and a means for determining an adjustment of the sensor assembly, relative to the lens assembly, based on an optimization of the performance indicators, while the sensor assembly is being attached to the lens assembly.

According to another aspect, a non-transitory computer readable medium including instructions that when executed cause a processor to perform a method of actively aligning an optical system, having a lens assembly and a sensor assembly, is disclosed. The method includes, positioning the sensor assembly, having at least an image sensor, at the focal plane of the lens assembly; directing light through an alignment optic and lens assembly onto the image sensor; producing multiple images from the light received through the lens assembly and alignment optic, the images having multiple alignment features based on the light received through the alignment optic, and the alignment features having multiple sections; measuring at least one performance indicator corresponding to each of the multiple sections; and adjusting the position of the image sensor based on an optimization of the performance indicators, while the sensor assembly is being attached to the lens assembly.

BRIEF DESCRIPTION OF THE DRAWINGS

The disclosed aspects will hereinafter be described in conjunction with the appended drawings, provided to illus

FIG. 4B illustrates an embodiment of alignment features.

FIG. 4C illustrates a close up view of the embodiment of alignment features illustrated in FIG. 4B.

FIG. 6A illustrates an Performance Indicator Scale (PSI) measurement of an optical system that is not aligned.

DETAILED DESCRIPTION

Figure 1:
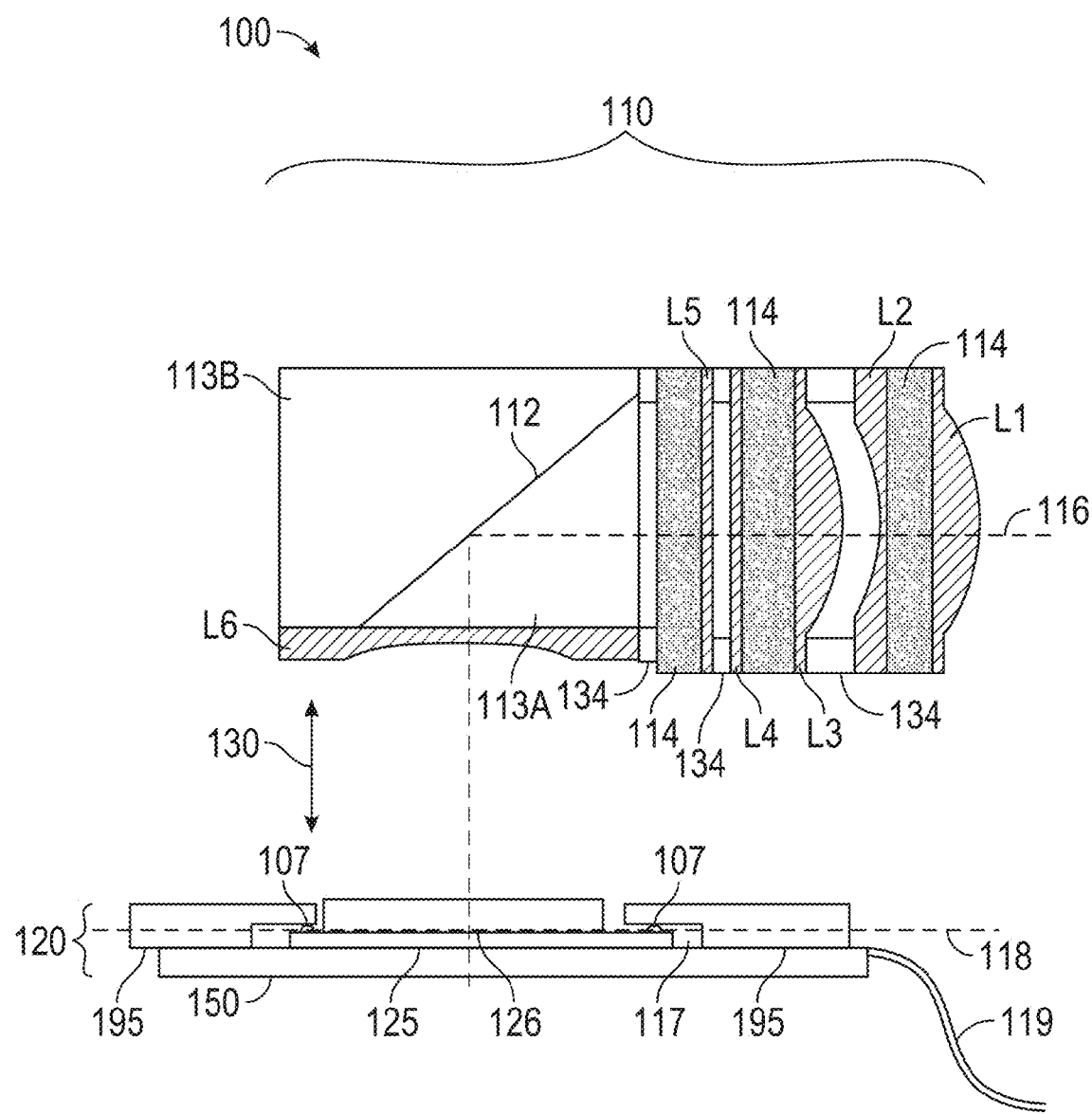
- FIG. 1 illustrates a cross-sectional side view of an embodiment of the components of an optical system.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Embodiments described herein include methods, apparatuses, and computer readable media configured to actively align an optical system during assembly. In some embodiments, the optical system may be one included in an imaging device of a mobile communications device, such as a cellular phone having a camera. The optical system may include a lens assembly and a sensor assembly, the sensor assembly having at least an image sensor. In some embodiments, the alignment of the sensor assembly with the lens assembly may be actively monitored during assembly to ensure performance of the optical system is not degraded as a result of misalignments while attaching the components of the optical system.

As discussed above, potential problem with high resolution lens assemblies and image sensors with small pixel can be the need to achieve high modulation transfer function ("MTF") resolution performance across the FOV of the image projected on the image sensor surface. Such performance may be a degraded due to minor misalignments while assembling the imaging device. The maximum MTF performance of a lens assembly is bounded by the diffraction limit of the lens assembly, which is determined by the f-number and the wavelengths of light passing through the lens assembly. The lens assembly is made up of one or more optical elements from the first surface of the lens assembly to the last surface of the lens assembly that projects the image onto another surface, such as an image sensor surface. An element can be made of one or more optical surfaces that can, for example, refract light or reflect light.

As the MTF performance requirements of a lens assembly increase towards its maximum performance (e.g., the diffraction limit), this may place more demands on the manufacturing alignment tolerances of the components of the lens assembly, including other aspects of the camera design. Examples of optical components or other camera design aspects that may require tighter tolerances are the alignment of the sensor assembly, the lens surfaces, the alignment of the lens surfaces with respect to one another, and the combined fabrication of the sensor assembly with the lens assembly as a single operating unit. The mechanical attachment of the sensor assembly to the lens assembly, for example, may create tilt errors (e.g. rotational errors about the optical axis) and/or translational errors (e.g. X, Y and Z linear direction errors about the optical axis) between the image sensor and the focal plane of the lens assembly. In a design intended for fabrication it is generally a good practice to establish limits for all key variations, such as rotational and translation alignment, and then determine a tolerance budget, or acceptable error, for all components, elements, or aspects that can create these variations, and those components, elements or aspects that can be influenced by those variations. The influence normally is expressed in a MTF reduction as one or more key variations change in amount. After determining the tolerance budget for all mechanical and optical components, elements or design aspects, those components, elements or aspects can then be designed so they stay within the budgeted tolerances with a certain level of statistical confidence. By viewing this system in this way, the optical system can be designed to an optimal alignment, within an acceptable error in the aforementioned variations.

Though discussed herein primarily in the context of MTF performance, this is for illustrative purposes, and lens performance can be expressed in other embodiments by similar concepts such as point spread function ("PSF"), Line Spread Function ("LSF") or other direct or indirect ways of expressing similar concepts.

The embodiments described herein may be used to actively monitor alignment of high MTF resolution optical system designs where the lens assembly and sensor assembly alignment can be optimized to reduce the misalignments that cause the MTF resolution to decrease, and/or to reduce the MTF sensitivity of the lens assembly, elements, aspects for the types and magnitude of the variations that may occur.

It should also be recognized that the embodiments presented herein are not limited to a specific image sensor having a specific pixel size, shape, pitch, rectangular array, non-rectangular array, or arrangement where the pixel size or shape can be different from one another on the surface of the image sensor. The embodiments are intended to point out the factors or aspects that are needed to design such a system and the benefits, attributes and claims of the system being described herein. The embodiments are not limited to the pixel size or other factors covered when describing or referring to those embodiments.

The alignment of the components of the optical system can have sensitivity to rotation and translational misalignments of the sensor assembly relative to the focal plane of the lens assembly. These variations can come from the manufacturing, fabrication, attachment of the components to one another, and interactions of other mechanical and/or optical components, elements or aspects as well as other environmental conditions such as motion, temperature, and shock. The rotation and translational misalignments can come from other related or unrelated sources. Other aspects can also have an impact on the MTF performance.

The embodiments described herein utilize methods intended to reduce the aforementioned misalignments during fabrication of the optical system.

In an illustrative embodiment, the optical system includes two components, a lens assembly and a sensor assembly. In some examples, the lens assembly may include multiple optical elements having a shared optical axis and configured to produce a focal plane at the desired focal length and resolution. The lens assembly can also include a field corrector lens positioned in close proximity to the sensor assembly. In some examples, the sensor assembly may include an image sensor for detecting incident light that passes through the lens assembly and capturing a desired image. In some embodiments, the sensor assembly may also include a glass sensor cover plate situated between the image sensor and the lens assembly. The alignment of the optical system may be actively monitored during the attachment process (e.g., while bring the lens assembly and sensor assembly together and attaching the components while optimally aligned). In some embodiments, the field corrector lens may be affixed (e.g., glued or mechanically held in place) to the glass sensor cover plate positioned over the sensor. In other embodiments, the lens assembly, or a portion thereof, may be attached (e.g., glued or mechanically held in place) to the sensor assembly, or a portion thereof.

In some embodiments, the alignment of the optical system includes an alignment optic configured to segment a light source incident on the optical system into multiple alignment features. In some embodiments, the alignment optic may be a lens specifically designed to create multiple alignment features without changing the location of the focal plane of the lens assembly. In some embodiments, for each configuration of the optical system (e.g., for each position change of the sensor assembly relative to the focal plane) an image of the alignment features may be captured. Alternatively, the alignment features may be actively monitored (e.g., a video of the resulting image). In an illustrative example, an axicon lens may be used as an alignment optic. The axicon lens may be configured segment an incident collimated light source into multiple concentric rings, whereby each concentric ring may represent an alignment feature.

In some embodiments, the alignment of the optical system may be based on an estimated adjustment of the sensor assembly relative to the focal plane of the lens assembly. The estimated adjustment may be based on a performance indicator of the alignment feature determined at a given optical system alignment. For example, the sensor may have a current orientation relative to the lens assembly, from which an image of multiple alignment features may be derived. A performance of the optical system (e.g., the quality of the alignment of the sensor assembly with the lens assembly) may then be determined based on a sharpness value for at least one alignment feature. In some embodiments, a sharpness value for all alignment features may be determined. For example, small nearly straight sections of the alignment feature can be created at the edge of each alignment feature and a sharpness value may be measured in a manner substantially similar to the common Slanted Edge MTF Measurement method. In other embodiments, sharpness values may be based on PSF, LSF or other direct or indirect ways of expressing similar concepts.

In one aspect, the sensor assembly is moved into the optimal alignment based on multiple iterations of determining the adjustment based on the performance indicators of the alignment features. Each iteration may be the result of a previously adjusted alignment, and a new alignment process to improve the overall alignment. In this way, the sensor assembly may be optimally aligned for the best MTF performance.

In an illustrative embodiment, the performance indicator for each alignment feature can be actively monitored and measured. For example, the performance indicator for sections along each alignment feature can be calculated. The performance indicators for the sections along the alignment feature are adjusted by tilting the image sensor at the focal plane in relation to the optical axis of the lens assembly during the gluing process. The image sensor tilt is adjusted until the performance indicators corresponding to multiple sections along a single alignment feature are balanced and uniform. By actively monitoring the performance indicators of the alignment features and adjusting the alignment during the gluing process, the sensor assembly may be ideally positioned and attached for optimal alignment enabling submicron pixels to be used in image sensors of thin camera systems.

Various embodiments will be described below in conjunction with the drawings for purposes of illustration. It should be appreciated that many other implementations of the disclosed concepts are possible, and various advantages can be achieved with the disclosed implementations.

Referring now to FIG. 1, an exemplary optical system of an imaging device will not be described in greater detail. FIG. 1 illustrates a cross-sectional side view of an example of an optical system 100 showing a lens assembly 110 and a sensor assembly 120.

As shown in the example of FIG. 1, an image sensor 125 is positioned on a printed circuit board 195. Sensor 125 is mounted within a rectangular slot 117 formed in a printed circuit board 195. Stud bumps 107 may be part of the sensor 125 and are used to make contact with electrically conducting pads on the printed circuit board 195. The printed circuit board 195 is mounted on a substrate 150 and remains stationary relative to image sensor 125. This is just one example of how the sensor 125 can be mounted to and makes electrical contact with printed circuit board 195. In some examples, a cover glass 126 is coupled to the sensor 125 during manufacturing in order to prevent contamination of a light receiving surface of the sensor 125. However, in some embodiments the cover glass 126 may be omitted and the lens assembly 110 may be coupled directly to the light sensitive surface of the image sensor 125. To accomplish this, the sensor 125 may be coupled directly to a surface of the lens L6 that is closest to the image sensor 125 during an alignment and attachment process, as described herein. The alignment and attachment process can occur along the path 130, as shown in FIG. 1 as the lenses assembly 110 is brought down towards the light sensitive surface of the image sensor 125.

In some embodiments, sensor assembly 120 includes an optional substrate 150. The substrate 150 may function as a protective surface configured to protect the image sensor 125 from environmental contaminants, such as dirt and moisture. In some embodiments, the substrate 150 may also be configured for other purposes, such as providing structural support or integrity.

The sensor assembly 120, as shown in FIG. 1, will be considered as a single unit for the purposes of this disclosure. In some embodiments, the image sensor 125 can be attached within the slot 117 of the printed circuit board 195. The printed circuit board 195 also includes a window configured to allow light to be incident on the light sensitive surface of the image sensor 125. In some embodiments, the printed circuit board 195 may be connected to the image sensor 125 via stud bumps 107 and/or an electrical connections within the slot 117. The printed circuit board 195 may or may not include the substrate 150. The sensor assembly 120 may or may not include the cover glass 126 attached to light sensitive surface of image sensor 125. The sensor assembly 120 may be constructed in other ways, means, methods, designs, manufactured, assembled or other configurations that may be conceived of in future methods or with present and past methods.

In some embodiments, a flex cable 119 is attached to the printed circuit board 195 at one end. Flex cable 119 may be configured to provide an electrical connection between the printed circuit board and other parts of an imaging system for image capture and or image streaming.

The image sensor 125 may comprise, in certain embodiments, a charge-coupled device (CCD), complementary metal oxide semiconductor sensor (CMOS), or any other image sensing device that receives light and generates image data in response to received light. Sensor 125 may be able to obtain image data of still photographs and may also provide information regarding motion in a captured video stream. Sensor 125 may be individual sensors or may represent arrays of sensors, such as a 3×1 array. Any suitable array of sensors may be used in the disclosed implementations.

In some embodiments, the lens L6 can be a field corrector lens and can be included as a component of lens assembly 110. As illustrated in FIG. 1, one possible embodiment of lens assembly 110 may include optical elements L1-L6, light folding surface 112, optical elements 114 and spacers 134. Lens assembly 110 may also include refractive element 113A using total internal refraction properties to create the reflective surface 112 and/or include an attached reflective surface (e.g., a mirror or other reflective surfaces) for light folding surface 112. Optical element 113A may or may not be present where light folding surface 112 is a reflective surface. Element 113B may or may not be part of the lens assembly 110. In embodiments where 113B is present, element 113B may or may not provide support features.

While the embodiment shown in FIG. 1, illustrates an exemplary lens assembly 110, it will be understood that some embodiments of lens assembly 110 may comprise any number of lens components, light folding surfaces, or other components and is not limited to those illustrated and not required to include those illustrated. As illustrated in FIG. 1, light folding surface 112 extends away from lens L6, and as illustrated is formed as a refractive prism 113A coupled to a support block 113B at the light folding surface 112. It is possible that a mirror surface be placed between the prism 113A and support block 113B instead of using the internal reflective characteristics of a prism to redirect light. In some other embodiments, light folding surface 112 can be flat or curved. A light folding surface can have a curvature that is part of the optical system 100, whereby it alters the path of light in a manner other than that of a flat surface. In some embodiments the light folding surface 112, refractive prism 113A and support block 113B may, individually or in combination, be referred to as a sensor prism.

In some embodiments, light folding surface 112 does not have to be a reflective surface between a refractive element 113A and support block 113B. Light folding surface 112 could be a reflective surface created by a the total internal reflection characteristics of an optical element such as 113A. In some embodiments, the refractive element 113A and light folding surface 112, due to the total internal reflection characteristics of element 113A, may be connected to support structure 113B. Alternatively, refractive element 113A and light folding surface 112 may not be connected to support structure 113B or support structure 113B may not be included in the lens assembly 110.

In other embodiments, light folding surface 112 may be a mirror or other reflecting surface. In embodiments comprising a reflective surface, the light folding surface 112 may be encompassed by a substance or medium having a low index of refraction, such as air vacuum that interfaces with the reflective surface. Embodiments of light folding surface 112 such as these are not shown in the figures illustrated herein. Such a light folding surface 112 may be held in place by a the mechanical structure or other mechanisms in order to maintain its position and alignment with respect to other components of the optical system and the light sensitive surface of image sensor 125.

In some embodiments, light folding surface 112 can be aligned with the light sensitive surface of the image sensor 125 using methods and procedures similar to that described herein. The light folding surface 112 and or structure holding light folding surface 112 can be attached to the light sensitive surface of the image sensor 125 or cover glass 126 using a gluing process or other means to hold the light folding surface 112 in place with respect to the image sensor 125.

Lenses L1-L5 are positioned between the light folding surface 112 and the last edge of lens assembly 110. Optical axis 116 shows one example of a path that light could take as it enters the optical assembly 100, passes through the lens assembly L1-L5, is redirected off of light folding surface 112, passes through lens L6 and the cover glass 122, and is incident upon the sensor 125.

In some embodiments, the sensor assembly 120 and lens assembly 110 is adhered or otherwise affixed in the illustrated configuration (see arrow 130) such that these components are fixed together relative to one another within the imaging device and the sensor 125 of sensor assembly 120 is positioned at the focal plane 118 of the lens assembly 110. The sensor assembly 120 may be positioned and aligned to the optical axis 116 of lens assembly 110 by utilizing the methods and systems disclosed herein. In some embodiments, these components may be permanently, or semi-permanently fixed together such that their positions with respect to one another stay the same, which stabilizes the optical path of light through the elements. In some embodiments, as discussed above, cover glass 126 may be omitted and the remaining sensor 125 of lens assembly 120 can be adhered or otherwise affixed to lens assembly 110.

As used herein, the term "optical system" refers to a sensor assembly, lens assembly and a number of corresponding light folding surfaces, for example, light folding surface 112, lens assembly 110 and sensor assembly 120 as illustrated in FIG. 1. Other optical system configurations that would benefit from the manufacturing methods and systems described herein are possible.

Figure 2:
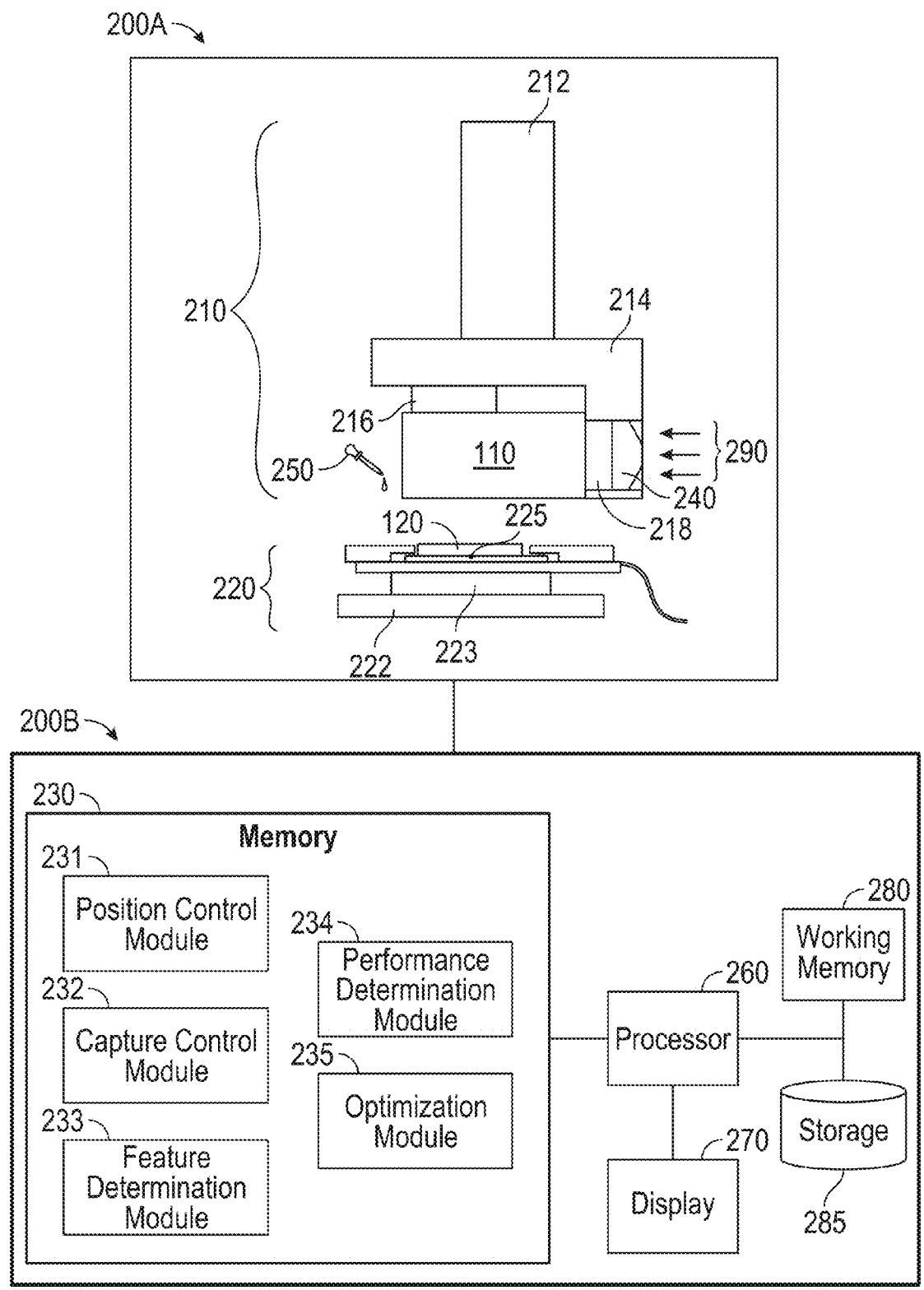
FIG. 2 illustrates a block diagram of an exemplary device in accordance with an embodiment.

Referring now to FIG. 2, an exemplary alignment apparatus will now be described in greater detail. FIG. 2 illustrates a cross-sectional side view of an example of an alignment apparatus 200A having a lens assembly holder 210, a sensor assembly holder 220, and an attachment mechanism 250. In some embodiments, alignment apparatus 200A may in electronic communication (either through wireless or hardwire communication) with a data processing device 200B, e.g., a personal computer, laptop, or any other device known for processing input data and exerting electrical control over the features of alignment apparatus 200A.

As illustrated, lens assembly holder 210 includes a pick-and-place head 212 having a pick-up tool 214, configured to be attached or coupled to lens assembly 110. In some embodiments, pick-up tool 214 includes a coupler 216 for grasping or attaching to lens assembly 110. For example, coupler 216 may be a clamp or other form of grasping mechanism having arms that extend along the surfaces of lens assembly 110 to securely hold lens assembly 110 in place relative to pick-up tool 214. In another embodiment, coupler 216 may be a mechanism for creating a pressure differential between the surfaces of the coupler and the lens assembly (e.g., a suction cup) thereby securely holding the lens assembly in place relative to pick-up tool 214. Therefore, coupler 216 may represent a means for securely holding lens assembly 110 in place relative to pick-up tool 214.

As illustrated, pick-up tool 214 includes opening 218 for accepting and securely supporting an alignment optic 240. The features and functions of alignment optic 240 will be described in greater detail in reference to FIGS. 3-5. Opening 218 may be positioned and configured to securely support alignment optic 240 in a fixed position relative to lens assembly 110. In some embodiments, alignment optic 240 is centered along the optical axis 116 of lens assembly 110, accurately enough such that the alignment optic does not change substantially the translational or rotational position of the focal plane of lens assembly 110. Therefore, pick-up tool 214 may be one means of fixedly aligning lens assembly 110 and alignment optic 240. In other embodiments, position of the alignment optic 240 may be securely fixed relative to the lens assembly 110 by a second pick-up tool (not shown) or by any other element of alignment apparatus 200A, such that alignment optic 240 is held in a fixed position relative to the lens assembly 110.

In some embodiments, lens assembly holder 210 may be moved in translational directions (e.g., X, Y, and Z directions) relative to the sensor assembly holder 220. In some embodiments, lens assembly holder 210 may receive an input or command to effectuate translational position adjustment of the lens assembly 110 relative to sensor assembly 120. For example, if a determination is made that the sensor assembly 120 is not optically aligned with optical axis 116, the lens assembly holder 210 may move the lens assembly in the X, Y, and/or Z directions relative to the sensor assembly to align optical system 100. Therefore, lens assembly holder 210 may represent one means for aligning sensor 120 with lens assembly 110. In another embodiment, pick-and-place head may move lens assembly 110 in at least one of the translational directions based, at least, on inputs related to the alignment of the optical system 100. In yet another embodiment, the lens assembly holder 210 may be fixed in any one or all of the translational directions, and any other element of the alignment apparatus 200A may be configured to move the sensor assembly holder 220 relative to the lens assembly 110. For example, sensor assembly holder 220 may be configured to move sensor assembly 120 in any one translational directions based, at least in part, on inputs from the device 200B.

In one illustrative embodiment, sensor assembly holder 220 includes a device, or combination of a devices, configured to adjust the rotational position (e.g., pitch, yaw, and/or roll) of the image sensor 125, as described with reference to FIG. 1, relative to the lens assembly 110 with minimal or substantially zero linear translation in the X, Y, and Z directions. In some embodiments, the sensor assembly 220 may include a rotating platform 222 configured to rotate the image sensor 125 about the optical axis of the lens assembly 110 and a goniometer 223 configured to adjust the pitch and yaw of the image sensor 125 relative to the lens assembly 110. The center of rotation of the rotating platform 222 may be positioned at a center of rotation point 225 that is aligned with the optical axis of the lens assembly and then the goniometer 223 may be attached to the rotating platform 222 such that the center of the pitch and yaw rotational adjustments is about the center point 225. In some embodiments, the center of rotation point 225 is some distance above the surface of goniometer 223, such that the light sensitive surface of image sensor 125 may be positioned at this point. The image sensor 125 may then be attached in such a way that the center of the light sensitive surface of the image sensor is located at the center of rotation point 225. In this way, the image sensor assembly 120 can be rotated in the roll, pitch, and yaw directions without having the center of the light sensitive surface of the image sensor 125 move in any of the X, Y and Z linear translational directions. Thus, the alignment and/or position of the image sensor 125 can be adjusted and rotated into alignment with an image projected by the lens assembly 110 onto the light sensitive surface of image sensor 125. For example, lens assembly 110 may project an image that is more rectangular in shape than circular. In this situation, the optimal alignment of image sensor 125 may be such that the image projected by lens assembly 110 will be better aligned with the light sensitive surface of the image sensor 125. The sensor assembly holder 220 described herein is just one illustrative embodiment, and other embodiments are possible where the sensor assembly holder 220 may comprise a two stage assembly device configured to pivot a rotation axis containing the center of the light sensitive surface of the image sensor 125 in such a way that the rotation can be described as pitching in one rotation direction and tilting in the yaw direction with respect to the pitch rotation direction.

In some embodiments, rotation adjustor platform 222 may represent a means to rotate the light sensitive surface of the image sensor 125 about the center of rotation point 225 in the pitch, yaw, and rotation directions without moving the center of rotation point 225 nor the image sensor 125 in the X, Y, and Z linear translational directions. It will be recognized that, the devices represented by elements 222 and 223 have tolerances making it difficult align and ensure that the axis of rotation in the pitch, yaw and roll directions go through the same ideal center of rotation point 225. For this reason, the center of rotation point 225 represents an ideal point where the axes of the pitch, yaw and roll directions are as close as possible to achieve the desired rotational adjustments with minimal or substantially zero X, Y and Z linear translation.

In some embodiments, sensor assembly 120 may be electrically connected to a hardware interface through the flex cable 119, as described above in reference to FIG. 1. The hardware electrical interface may be configured to capture images and or a video stream of images. The images and or video stream of images may be used by a system, for example those disclosed herein, to provide movement directions for lens assembly holder 210 to move the lens assembly 110 in the linear translational directions X, Y and Z. Device 200B may also be used to provide pitch, yaw and roll rotation movement of sensor assembly holder 220 based on the image and or video stream used to actuate the motion of lens holder assembly 210. While one illustrative embodiment is provided in detail herein, other means may be possible to electrically connect to sensor assembly 120 to a hardware interface to facilitate positional adjustments in the translational directions as well as the pitch, yaw and roll rotational directions. For example, wireless connections over Bluetooth, WiFi networks, or the like.

As illustrated in FIG. 2, alignment apparatus 200A includes a light source 290. In some embodiments, light source 290 may be a collimated light source. For example, a green laser source having a narrow band light spectrum about a wavelength that may be approximately 550 nm. The light emitted from the laser source may pass through a beam expander before being projected as beam 290 as shown in the drawing 200A. While a laser source is represented herein as having a single wavelength, representing a color of light in the visible spectrum, a laser light source may emit a narrow range of wavelengths around the single wavelength. In one embodiment, the light source 290 is a collimated laser light source producing light having a wavelength that corresponds to the color green and is aligned with the optical axis of the lens assembly 110. In one embodiment, the alignment apparatus 200A is configured such that the light source 290 passes through the alignment optic 240, through lens assembly 110 and is incident on the light sensitive surface of image sensor 125 of sensor assembly 120, thereby producing at least one image. The image may include multiple alignment features as result of passing the light through the alignment optic 240. Each alignment feature may include multiple sections from which a performance indicator may be determined, as will be described in greater detail below in reference to FIG. 4B. Therefore, the alignment optic, the optical system 100, and the light source 290, either together or individually, may represent at least one means for producing an image having multiple alignment features.

In some embodiments, attachment mechanism 250, as shown in drawing 200A, is configured to attach lens assembly 110 to the cover glass 126 or directly to the light sensitive surface of image sensor 125, such that these components are fixed relative to one another within the imaging device. In some embodiments, the attachment mechanism 250 may permanently, or semi-permanently affix these components together such that their positions with respect to one another stay the same, which stabilizes the optical path of light through the elements. Therefore, attachment mechanism 250 may represent one means for attaching sensor assembly 120 and lens assembly 110.

In some embodiments, attachment mechanism 250 may be a controllable arm or machine configured to apply an amount of adhesive liquid or gel to a portion of at least one surface of the lens assembly 110, a portion of the cover glass 126, provided a the cover glass 126 is used, and/or a portion the light sensitive surface of image sensor 125 where the cover glass 126 is not used. For example, the surface of lens L6 of lens assembly 110 positioned closest to the image sensor 125, having the amount of adhesive thereon, may be brought into contact with either cover glass 126 or light sensitive surface of image sensor 125. In some embodiments, the adhesive does not need to contact the light sensitive surface of image sensor 125. Then, the lens assembly 110 and the light sensitive surface of image sensor 125 may be optimally aligned utilizing the methods and systems disclosed herein. Upon optimally aligning the optical system, a curing energy, e.g., ultra violet light source, may be incident on the adhesive. The adhesive may be configured to react to the curing energy, thereby hardening and causing the lens assembly 110 and image sensor 125 to become attached. In another embodiment, the adhesive is applied to the at least one surface of the optical system 100 prior to commencing the alignment process disclosed in FIGS. 6 and 9, and the adhesive is cured after optimally aligning the optical system 100. In another embodiment, the adhesive may be applied at any time during the alignment process, and the adhesive is cured after optimally aligning the lens and sensor assemblies 110, 120. In this way, the methods and systems disclosed herein are capable of optimally aligning while assembling the components of the optical system 100.

In some embodiments, attachment mechanism 250 receives an instructions from device 200B, discussed below, as to where and when to attach the components. For example, after completing the methods, or portion thereof, disclosed in FIGS. 5 and 7, at least one processor may trigger the attachment mechanism 250, based, at least in part, on inputs from the position of the light sensitive surface of image sensor 125 relative to the focal plane and performance indicators. Therefore, attachment mechanism 250 may represent at least one means for receiving input parameters to trigger attachment of the lens assembly 110 to the image sensor 125.

In some embodiments, device 200B may be designed as part of apparatus 200A, or apparatus 200A as part of device 200B. Device 200B may be, or may be part of, a cell phone, tablet computer, personal computer, or any device known in the art for implementing a software or automat solution, for example by one or more processors executed by a logic device. Device 200B includes a processor 260 which is operably connected to alignment apparatus 200A, working memory 280, storage 285, and display 270. In addition, processor 260 is connected to a memory 230. The memory 230 stores several modules that store data values defining instructions to configure processor 260 to perform functions of device 200B. The memory 230 includes a position control module 231, a capture control module 232, a feature determination module 233, performance determination module 234, and an optimization module 235. Some embodiments may include multiple processors.

In an illustrative embodiment, light from light source 290 enters the lens assembly 110 and is focused on an area in the image space that may or may not be perfectly planar. One process, for example, is to move the X, Y and Z linear translational positions of the lens assembly 110 above the light sensitive surface of image sensor 125, where motion in the Z direction moves the lens assembly away from or towards the image sensor 125 and the X and Y linear directions, which may be orthogonal with respect to each other, can be used to optimally position the lens assemble 110 about the center of the light sensitive surface of image sensor 125. In one aspect, the image sensor 125 utilizes a charge coupled device. In another aspect, the image sensor 125 utilizes either a CMOS or CCD sensor.

The display 270 is configured to display images and frames captured via lens assembly 110 and sensor assembly 120 and may also be utilized to implement configuration functions of device 200B. In one implementation, display 270 can be configured to display one or more images captured by sensor assembly 120 and lens assembly 110.

The working memory 280 may be utilized by the processor 260 to store data dynamically created during operation of the device 200B. For example, instructions from any of the modules stored in the memory 230 (discussed below) may be stored in working memory 280 when executed by the processor 260. The working memory 280 may also store dynamic run time data, such as stack or heap data utilized by programs executing on processor 260. The storage 285 may be utilized to store data created by imaging device 200B. For example, images captured via optical system 100 may be stored on storage 285.

Alignment apparatus 200A may be configured to receive input and control instructions from device 200B, based, at least in part, on instructions from at least one module of memory 230 configuring processor 260. Processor 260 may issue a command triggering the at least one of the lens assembly holder 210 and/or sensor assembly holder 220, as described above. Therefore, alignment apparatus 200A may represent at least on means for receiving input parameters for adjusting the position of the sensor assembly 120 relative to the lens assembly 110.

Figure 5:
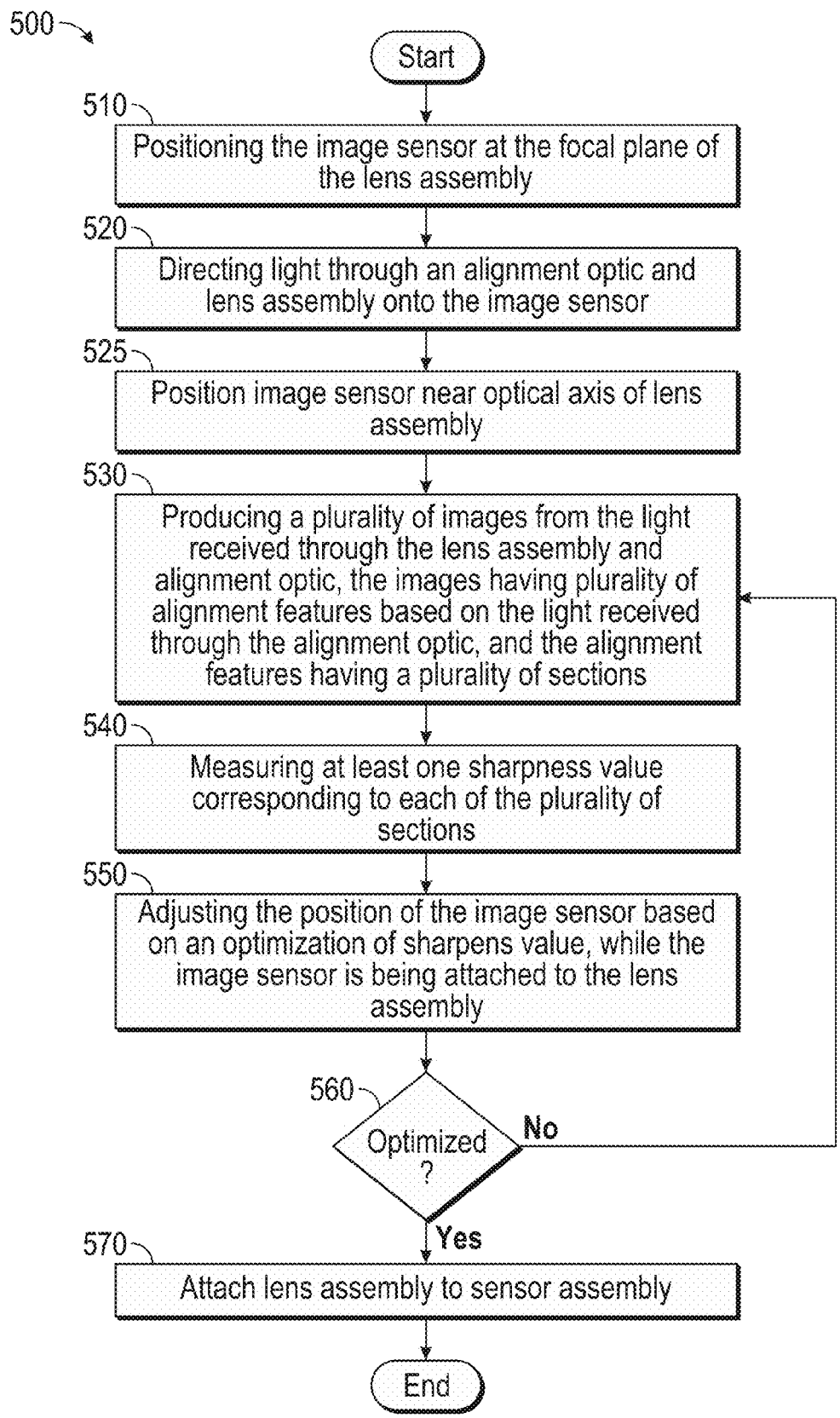
FIG. 5 is a flowchart for a method of actively aligning an optical system in accordance with an embodiment.
Figure 7:
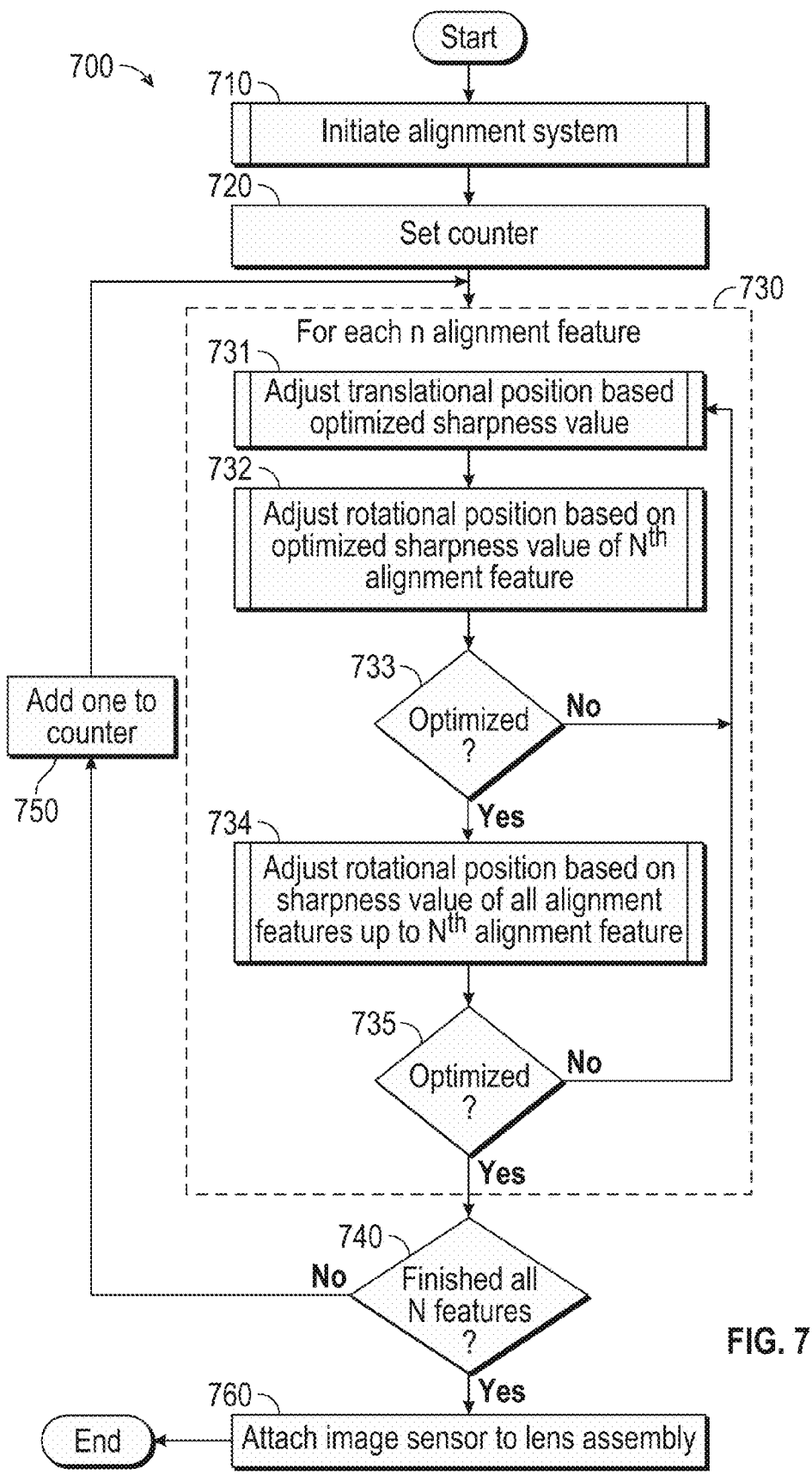
FIG. 7 is a flowchart of a method for actively aligning an optical system in accordance with an embodiment.

The memory 230 may be considered a computer readable media and stores several modules. The module store data values defining instructions for processor 260. These instructions configure the processor 260 to perform functions of device 200B. For example, in some aspects, memory 230 may be configured to store instructions that cause the processor 260 to perform methods 500 and/or 700, or portions thereof, as described below and as illustrated in FIGS. 5 and 7. In the illustrated embodiment, the memory 230 includes a position control module 231, a capture control module 232, a feature determination module 233, a performance determination module 234, and an optimization module 235.

The position control module 231 includes instructions that configure processor 260 to send a command to alignment apparatus 200A to move the sensor assembly holder 220 and/or lens assembly holder 210. Instructions in the position control module 231 may configure processor 260 to effect an adjustment of the position of sensor assembly 120 relative to lens assembly 110. In another embodiment, the position control module 231 may send optical system alignment information to processor 260 which issues a command to the apparatus 200A to effect an adjustment or movement of sensor assembly 120 and/or lens assembly 110. Therefore, position control module 231 may represent one means for adjusting the alignment of the optical system during assembly. In another embodiment, the instructions in position control module 231 may send the current optical system configuration, along with other input parameters, to the optimization module 235. Therefore, instructions in the position control module 231 may represent one means for determining a current optical system 100 alignment and target optical system 100 alignment. Instructions in optimization module 235 may represent one means of receiving position input parameters.

Instructions in the capture control module 232 may include instructions that configure processor 260 to capture an image based, at least in part, on the light from light source 290 directed into lens assembly 110 and sensor assembly 120. For example, capture control module 232 may include instructions that call subroutines to configure processor 260 to capture a current image, having passed alignment optic 240, lens assembly 110, and incident on the image sensitive surface of image sensor 125 of sensor assembly 120. In some embodiments, the captured image may be displayed on display 270 for processing or inspection by a user. In other embodiments, the captured image may be stored in working memory 280 and/or storage 285 for retrieval and processing by processor 260 based, at least in part, on one or more of the modules of memory 230. Therefore, capture control module 232 may represent one means for capturing an image. In some embodiments, capture control module 232 may receive inputs from position control module 231 indicating the completion of a movement of the sensor assembly 120 and/or lens assembly 120.

Instructions in the feature determination module 233 may include instructions that configure processor 260 to resolve alignment features depicted in a captured image. For example, feature determination module 233 may include instructions to configure processor 260 to determine the number of alignment features contained in an image. In some embodiments, the feature determination module 233 may include instructions to configure the processor 260 to resolve sections of the alignment feature. For example, as will be described in reference to FIG. 4B in greater detail, instructions in feature determination module 233 may configure processor 260 to construct small nearly straight sections of each alignment feature. The section is configured such that it covers multiple pixels in such a way that the level of light received by each pixel, due to the alignment feature, gradually increases from dark to bright in value. Therefore, feature determination module 233 may represent on means of resolving alignment features, determining the number of features, and identifying sections of each alignment feature. In some embodiments, the feature determination module 233 may transmit information related to the sections to performance determination module 234. Therefore, performance determination module 234 may represent one means for receiving information related to the points of the alignment feature.

Figure 6B:
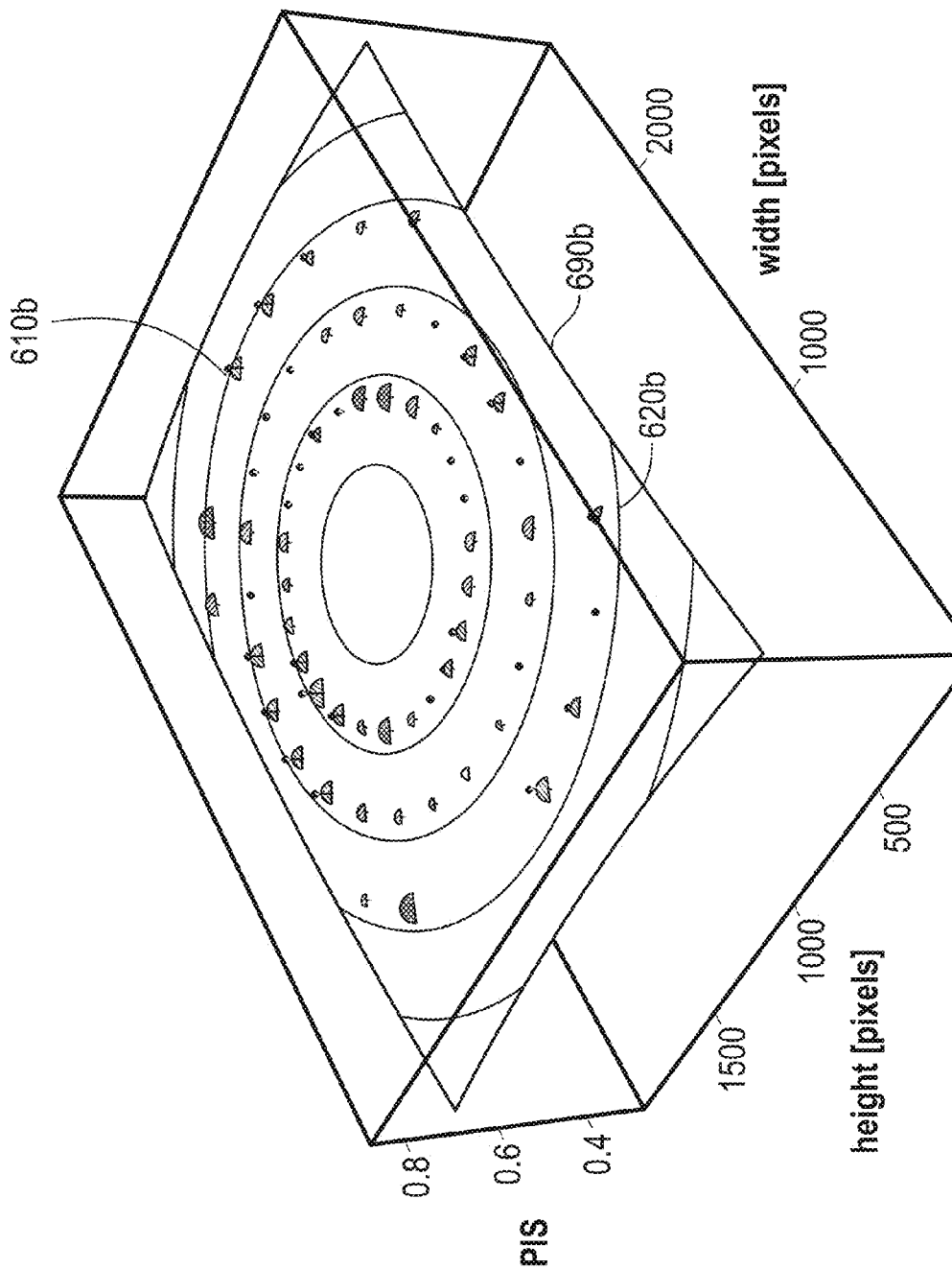
FIG. 6B illustrates an Performance Indicator Scale (PSI) measurement of an optical system near optimum alignment in accordance with an embodiment.

Instructions in the performance determination module 234 may include instructions that configure processor 260 to measure a performance indicator based, at least in part, on information related to the sections of at least one alignment feature. In some embodiments, the performance indicator may be represented by at least one sharpness value based on each section of the resolved alignment features, as illustrated in FIGS. 6A and 6B. The sharpness value may be related to the quality of the focus alignment between optical assembly 110 and the sensor surface of image sensor 125, whereby a higher sharpness value may represent that the optical system is closer to optimal alignment. For example, performance may be based on sharpness determinations that are similar to the slanted edge MTF measurement, PSF, LSF, or other direct or indirect ways of expressing the performance of an optical system, as will be discussed below in reference to FIG. 4B. In some embodiments, the sharpness value is determined based on the detected light level readout of each pixel along a section of the alignment feature. Where the light level on the average gradually increases from dark too bright in value, then one skilled in the art may determine a sharpness value in a manner similar to calculating MTF (e.g., the common Slanted Edge MTF Measurement method). The actual calculation may not yield an MTF value that an actual slanted edge method may produce, but the result may represent the sharpness value that increases or decreases in a manner similar to the slanted edge MTF measurement would under similar conditions. Therefore, performance determination module 234 may represent one means for determining the performance of an optical system alignment based, at least in part, on the sections of a given alignment feature. In some embodiments, the performance determination module 234 may transmit information related to the performance of the optical system 100 at each point, via feature determination module 233, to optimization module 235.

Instructions in the optimization module 235 may include instructions that configure processor 260 to optimize the alignment of the optical system 100. In some aspects, optimization module 235 may accept information related to the performance of each point from the capture control module 232, feature determination module 233, and/or performance determination module 234. Based on the current performance at each point of a captured image, the optimization module 235 may estimate the translational and rotational adjustments to apply to the sensor assembly 120 relative to the lens assembly 110 such as to optimally align the optical system 100. For example, in some aspects, optimization module 235 may include instructions to configure processor 260 to perform optimization routines similar to methods 500 and/or 700, or portions thereof, as described below and as illustrated in FIGS. 5 and 7. Therefore, optimization module 235 may represent one means of determining an adjustment amount to apply to the optical system 100. In some embodiments, the optimization module 235 may transmit the adjustment to position control module 231, which may then issue instruction to configure the processor 260 to trigger apparatus 200A to move the sensor assembly 120 and/or lens assembly 110.

Figure 3A:
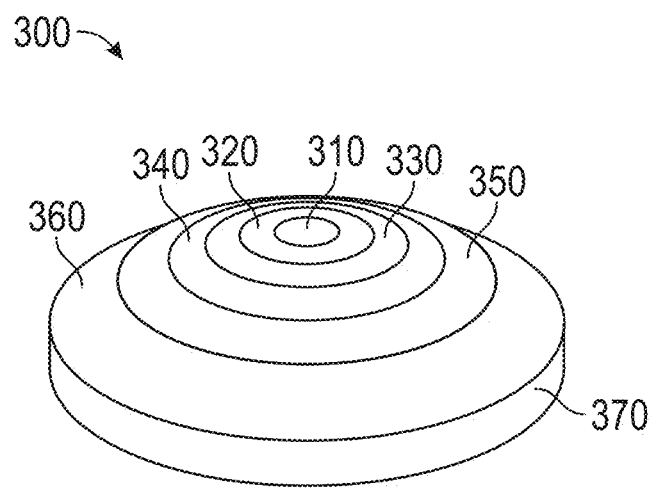
FIG. 3A is a perspective view of an alignment optic in accordance with an embodiment.
Figure 3B:
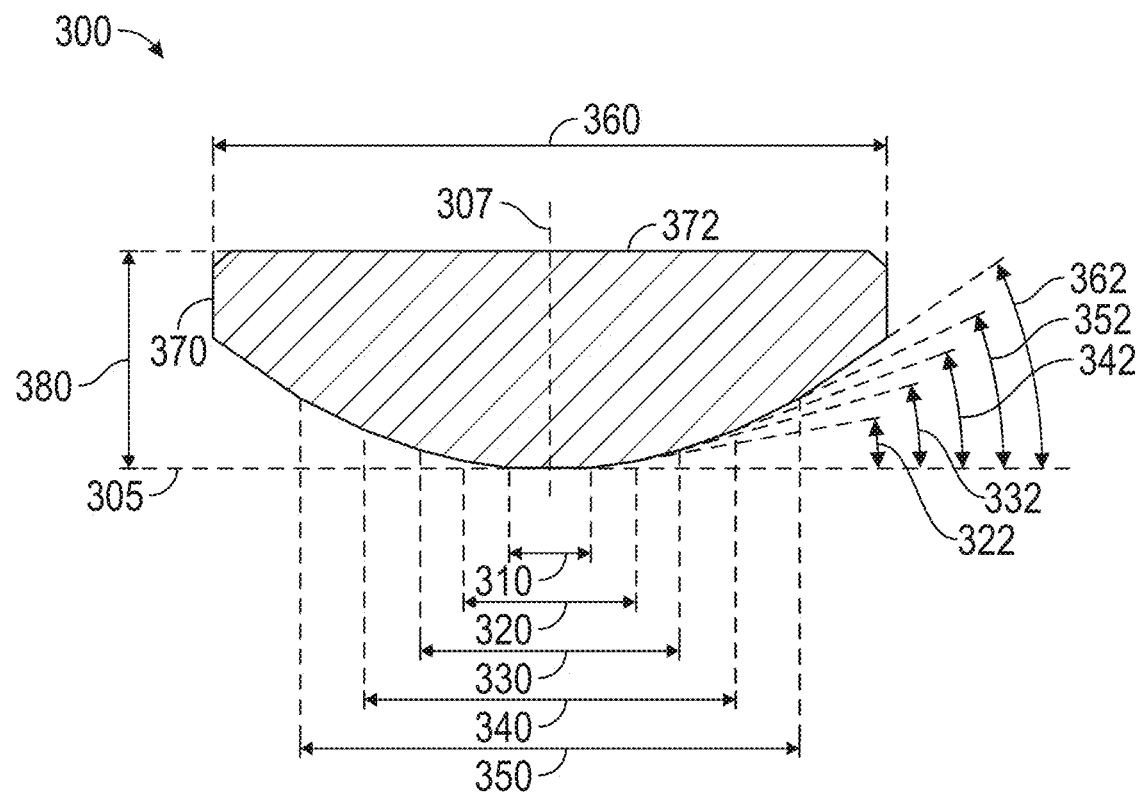
FIG. 3B is a cross-sectional view of an alignment optic in accordance with an embodiment.
Figure 4A:
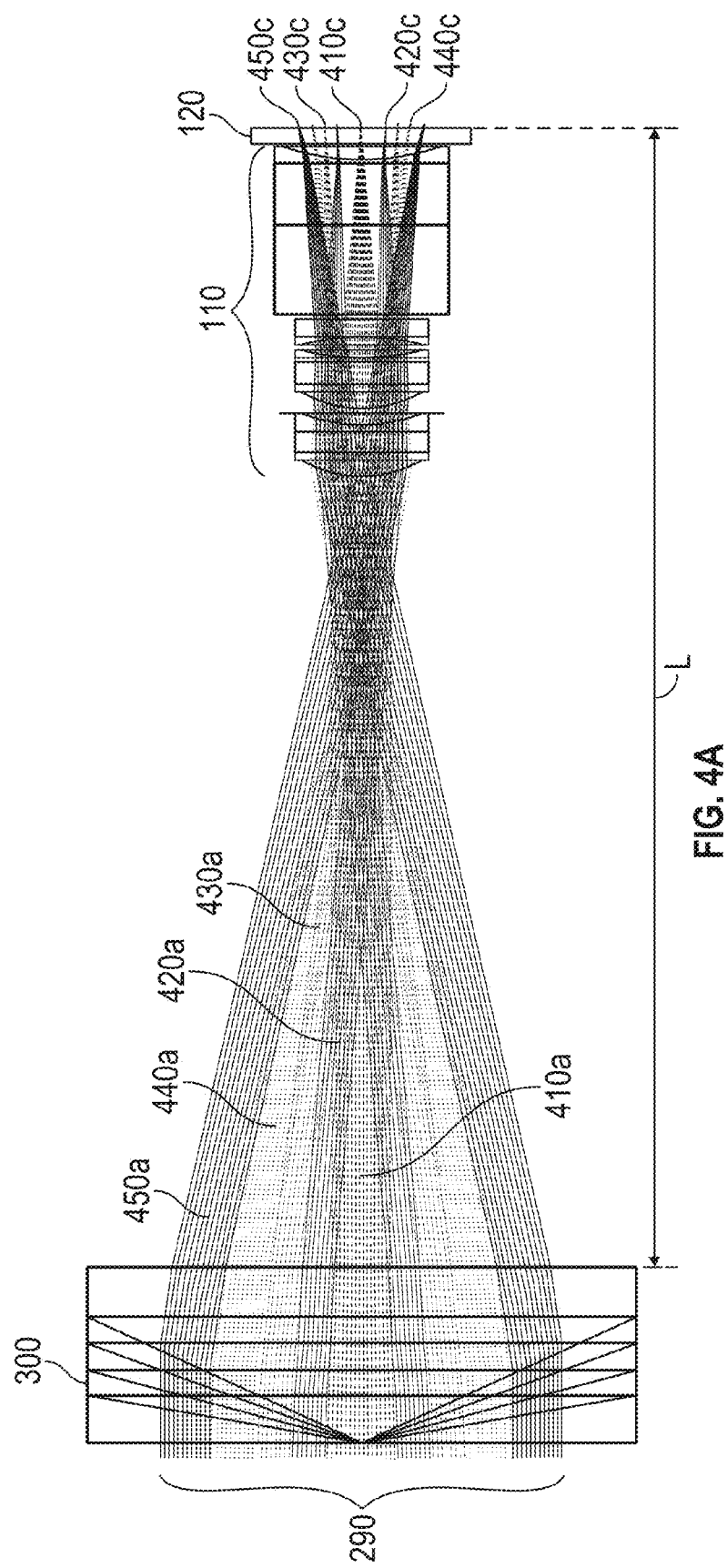
FIG. 4A illustrates a ray trace of light as it passes through an alignment optic and optical system in accordance with an embodiment.

FIGS. 3A and 3B illustrate an alignment optic configured to segment incident light into multiple alignment features, in accordance with one embodiment. In some embodiments, the alignment optic used may be an axicon, for example a multi-zone axicon with a flat top surface such as one illustrated in FIGS. 3A and 3B. In an illustrative embodiment, the alignment optic 240 is configured to segment the light from light source 290 into alignment features. The alignment features, generated by alignment optic 240, are incident on image sensor 125, and captured in an image for use in determining an optimal optical system configuration as described below. For example, by using an axicon lens, such as axicon 300 depicted in FIGS. 3A and 3B, a collimated light beam 290 may be segmented into multiple concentric rings 420-450, as shown in FIGS. 4A and 4B and described in more detail below. In one embodiment, axicon 300 segments a collimated green laser light source into four concentric rings, in accordance with the principles discussed below in reference to FIGS. 4A and 4B.

FIGS. 3A and 3B depict two views of an axicon 300, which may be used in apparatus 200A as alignment optic 240. The axicon 300 illustrated in FIGS. 3A and 3B is a multi-zone axicon flat top lens, having a flat top surface 310, a flat base 372 parallel with the surface 310 and a the multiple conical regions 320-360 including sidewall 370 connecting to the base 372 and to the conical region surface 360. The flat surface 372 is perpendicular to the axicon optical axis 307.

In an illustrative embodiment of an axicon lens, axicon 300 is designed as have height 380 of 4 mm, a base diameter 360 of 12.5 mm, a flat top diameter 310 of 1.6 mm. The flat top surface 310 is a planar surface coincident with a plane 305 that is parallel to base 372. Plane 305 is represented as a dashed line shown in FIG. 3B. The axicon lens 300 has an optical axis 307 that is perpendicular to the plane 305. The flat top surface 310 has a radius of 0.8 mm about the axicon lens optical axis 307 and is perpendicular to the optical axis 307. The first axicon surface 320 is tilted at an angle of 10 degrees with respect to the plane 305 and is contained by an intersecting edge between flat top surface 310 at a the radius of 0.8 mm from the optical axis 307 and a cylindrical surface (not shown) having a radius of 1.6 mm from optical axis 307 and being parallel with the respect to optical axis 307. The second axicon surface 330 is tilted at an angle of 15 degrees with respect to the plane 305 and is contained by an intersecting edge between the first axicon surface 320 at a the radius of 1.6 mm from the optical axis and a cylindrical surface (not shown) parallel with respect to the optical axis 307 and has a radius of 2.4 mm from the optical axis 307. The third axicon surface 340 is tilted at an angle of 20 degrees with respect to the plane 305 and is contained by an intersecting edge between the second axicon surface 330 at a the radius of 2.4 mm from the optical axis and a cylindrical surface (not shown) that is parallel with respect to the optical axis 307 and has a radius of 3.4 mm from the optical axis 307. The fourth axicon surface 350 is tilted at an angle of 25 degrees with respect to the plane 305 and is contained by an intersecting edge between the third axicon surface 340 at a the radius of 3.4 mm from the optical axis and a cylindrical surface (not shown) that is parallel with the optical axis 307 and has a radius of 4.6 mm from the optical axis 307. The fifth axicon surface 360 is tilted at an angle of 35 degrees with respect to the plane 305 and is contained by an intersecting edge between the fourth axicon surface 350 at a the radius of 4.6 mm from the optical axis and the sidewall 370, as shown in FIG. 3B, that is parallel with the optical axis 307 and has a radius of 6.25 mm from the optical axis 307.

FIGS. 4A-4C illustrate alignment features resulting from a collimated beam of light from light source 290 as the light passes through the axicon lens 300, the lens assembly 110, and the sensor assembly 120. FIG. 4A illustrates a simulated ray trace diagram tracing a path of light through the axicon lens 300, the lens assembly 110, the sensor assembly 120, and being incident on the image sensor 125. As illustrated in FIG. 4A, the optical axes of the lens assembly 110, the sensor assembly 120, and the image sensor 125 image surface are sufficiently parallel and coincident with the optical axis 307 such that, in this embodiment, the elements have approximately the same optical axis positioned along the optical axis 307. The simulation results can be obtained by ray tracing software (for example, Zemax™ SW).

In some embodiments, the light source 290 is a as a helium-neon green laser source. When the light source 290 is a green laser source, FIGS. 4A-4C illustrate the light source 290 as it passes through a beam expander (not shown) prior to passing through the axicon lens 300. The beam expander can be configured to expand the laser beam to be a collimated beam measuring approximately 11.4 to 11.8 mm in diameter with a center axis substantially parallel and coincident with the optical axis 307 of the axicon lens 300. In some embodiments, the radius of the beam from the optical axis 307 is slightly less than 5.9 mm and greater than 5.7 mm. The light from source 290 comprises coherent light rays having wavelengths within approximately a nanometer about the average wavelength of the green laser source of light source 290. In some embodiments, the average wavelength of a helium-neon green laser source is approximately 543 nm.

In some embodiments, the material that the axicon lens 300 is made of is selected to have suitable index of refraction such that light rays incident upon any one surface of the axicon lens 300 (e.g., flat top surface 310, base 372, or axicon surfaces 310, 320, 330, 340, 350, 360) remains substantially parallel with the other rays incident upon the same surface, at least until rays are manipulated by the lens assembly 110. For example, light rays that are incident upon the fourth axicon surface 350 produce a group of rays 450a that remain substantially parallel with each other as they travel through the axicon lens 300 and emerge from the axicon lens 300, via base 372. Upon emerging from base 372, the group of rays 450*a* remain substantially parallel until they are incident upon lens assembly 110. The group of rays 450*a* travel through the lens assembly 110 and are focused at the image sensor 125 at point 450*c*, which, as illustrated in FIG. 4B, forms an alignment feature or concentric ring 450*b*. In this way, group of rays 450*a* appear to be similar to a group of rays emitted from a black target with narrow circular lines about an optical axis 307 perpendicular to an imaging surface (e.g., image sensor 125). The imaging surface being far enough away that the group of rays 450*a* produce narrow circular lines on the light sensitive surface of image sensor 125 in the absence of optical geometric distortion.

Similarly, in embodiments described herein, the groups of rays 440*a*, 430*a* and 420*a* are incident upon the axicon surfaces 340, 330 and 320, respectfully, and produce narrow circular lines on the light sensitive surface of image sensor 125 in the absence of optical geometric distortion. The combination of the narrow circular lines may produce concentric rings created by the group of rays 450*a*, 440*a*, 430*a*, and 420*a* on the sensor surface of the image sensor 125, as illustrated in FIG. 4B as lines 450*b*, 440*b*, 430*b* and 420*b* respectively. As shown in the illustrative example of FIG. 4B, concentric ring 450*b* appears as a partial circle as a result of the image projected on the image sensor 125 being larger in diameter than the rectangular height of the image sensor 125 while being within the width of the image sensor 125.

The center dot 410*b* may be formed from the central parallel group of rays 410*a* incident upon the flat top surface 310 on the axicon lens 300 and emerging into air as group of rays 410*a* from the base surface 372. The group of rays 410*a* are substantially parallel with each ray in the group 410*a*, so as to appear that they are coming from a dot of light on the same black target as the circular lines on the target. Group of rays 410*a* may pass through the optical lens assembly 110 and form a dot on the optical axis 307 intersection the light sensitive surface of the image sensor 125.

Figure 4D:
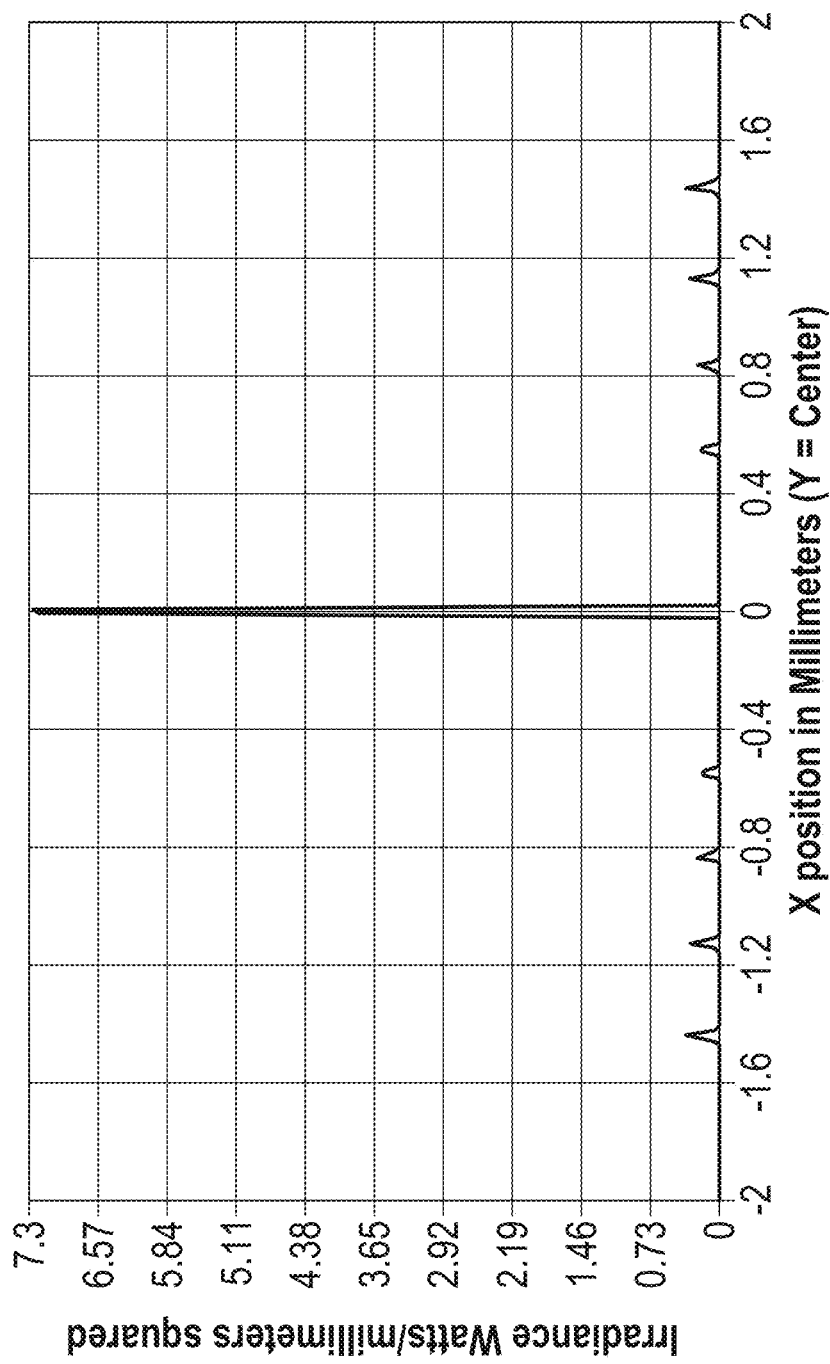
FIG. 4D is an exemplary graph depicting the intensity of light measured across an image sensor in accordance with the embodiment illustrated in FIG. 4B.

FIG. 4D is an exemplary graph depicting an intensity of light measured across the image sensor 125 resulting from the ray trace diagram of FIG. 4A. In the embodiment illustrated herein, the intensity of light across the image sensor 125 results from imaging the optical system as illustrated in FIG. 4A using the axicon lens 300, the optical lens assembly 110, and the sensor assembly 120 having image sensor 125. In this embodiment, the optical surfaces of each component are immersed in air or a vacuumed with light from light source 290 being incident on the axicon lens 300, as described above with reference to FIG. 4A.

FIGS. 4B and 4C also illustrates an exemplary method of determining a sharpness value of the alignment features. FIG. 4C is a close-up view of FIG. 4B showing an exemplary representation of concentric rings 440*b* and 450*b* detected by an image sensor 125. While the following discussion refers to concentric rings 440*b* and 450*b*, it will be understood that aspects described herein apply in substantially similar manner to all alignment features, not only those represented in FIGS. 4A-4C. As illustrated in FIG. 4C, concentric rings 440*b* and 450*b* are represented as having a gradual increase and decrease in intensity along the concentric ring 440*b*, 450*b*. As shown in FIG. 4C, concentric rings 440*b* and 450*b* are shown as being made up of multiple square adjacent boxes with different levels of gray across each box. Each square box represents a pixel of the image sensor 125 having a detected value corresponding to a level of light intensity based on the light incident on that pixel. The detected value can be sampled from the image sensor 125 during a sample and read process, such as methods used for CCD sensors, CMOS sensors, or any image sensor comprising multiple pixels to generate an image based on incident light. Further, the darker the grayscale level indicates a greater level of light intensity projected on the pixel relative to the lighter gray square boxes.

In some embodiments, the image sensor is monochrome and the pixels shown in FIG. 4C may be physically adjacent pixels on the image sensor. In other embodiments, the image sensor may comprise a Bayer Color pattern made up of Red, Green-red, Blue, and Green-blue color pixels (e.g., R, Gr, B and Gb colored pixels). In this instance, a sub-sample of pixels may be analyzed, where the sub-sample includes four color planes where each plane has as a common color. For example, the color Red and each Red pixel maintains its same relative position with respect to the neighboring Red pixels as that within the Bayer R, Gr, B and Gb color array of the image sensor 125. In the embodiment illustrated in FIG. 4A having a green laser light source 290, the use one of the two green color planes Gr or Gb may be beneficial. It is possible to use both Gr and Gb when implementing the methods and systems described herein. It is to be understood that the methods and systems below will use one of the two color planes Gr or Gb in the case of using a Bayer sensor, where the same principles, methods and systems can be used to include both green channels Gr and Gb.

In some embodiments, sub-sample pixel outputs and Bayer arrays may be configured to represent a color plan such as Gr or Gb or R or B. Other embodiments may be possible using other color patterns where there may be more or less color planes where it may be possible to sub-sample the pixels to create pixels of one common color plane. In still other embodiments, color patterns may be envision that have white color pixels or yellow color pixels or other different colors made that may be used, configured to create color planes of common colors including, for example, the white color pixels.

In some embodiments, detailed below, methods and systems may be envisioned that utilize the example square pixels positioned in a regular grid pattern made of horizontal rows and vertical columns. It is not necessary for the pixels to be square nor for the pixels to be arranged in the same manor such as the one used herein in order to use the methods and systems described herein.

In an illustrative embodiment, a methods based on using a slanted edge approach to measuring the Spatial Frequency Response ("SFR") of an optical system may be used to determine a sharpness measurement along a linear segment. The slanted edge method includes an image of a black bar on a white target imaged on an image sensor. This black bar may be measured using methods adapted to measure the SFR using the slanted edge method. The black bar may be considered as have a large enough width and a large enough whiter area where there are more than, for example five dark imaged pixels and more than 5 white pixels about the imaged edge of the back bar on the image sensor surface.

Similar methods may be used in the methods and systems disclosed herein. For example, sharpness measurement can determined along linear segments of the circular lines 420*b*, 430*b*, 440*b* and 450*b* based on the slanted edge method for measuring the SFR of an optical system, such as the optical assembly 110 and image sensor assembly 120 illustrated in FIG. 1. While an accurate method to measure the SFR response of a system SFR may not be possible, it is possible to adapt the same methods used for calculating the SFR response with the slanted edge approach to the concentric rings of FIG. 4C. FIG. 4C depicts a line 441c including multiple pixels having increased light intensity and then decreasing light intensity. As described above with reference to FIGS. 4B and 4C, the intensity of the light projected on to the pixels of the image sensor increases as the representation of the each pixel gets darker as depicted in FIGS. 4B and 4C. A sharpness or performance indicator may be determined indicative of the sharpness of the concentric ring, even though the measurement may not yield an accurate SFR of the system in a given segment of the circular ring. In this way select segments, such as that shown for the line 441c can be used, where a sharpness value may be determined using the methods and principles for calculating the SFR using the slanted edge method. In order to have uniform sharpness measurements across the light sensitive surface of an image sensor, such as image sensor 125, is to use a uniform set of segments such as the line 441c throughout the light sensitive surface of the image sensor (e.g., multiple line segments positioned through the concentric rings). A process described below, with reference to FIG. 5, can then be used to optimize the sharpness values across the image sensor 125 while the optical assembly 110 is aligned with the image sensor 125. The sharpness values along each segment, such as line 441c, may be determined by the performance determination module 234 as described in reference to FIG. 2.

FIG. 5 is a flowchart of a process for actively aligning a lens assembly 110 and the image sensor 125 image surface during the assembly of an optical system 100. Process 500 may be performed by alignment apparatus 200A, either independently or in conjunction, with data processing device 200B as illustrated in FIG. 2. In some embodiments, the method of for actively aligning a lens assembly 110 and the image surface of image sensor 125 within sensor assembly 120 may be performed by the alignment apparatus 200A in communication with any one of the modules of memory 230. The method can be implemented as a software solution by the memory 230 or implemented elsewhere by data processing device 200B, for example one or more processors executed by a logic device in processor 260.

Process 500 begins at a start block and then moves to block 510, where the system positions a sensor assembly near the focal plane of the lens assembly. In some embodiments, the sensor assembly may be sensor assembly 120 having an image sensor 125 positioned at the focal plane of the lens assembly 110. In some embodiments, sensor assembly may or may not include sensor cover glass 122. In an illustrative embodiment, the sensor assembly is roughly positioned at the focal plane, thereby relying on the subsequent adjustments to finely tune the configuration of optical system 100 during assembly. Instructions included in position control module 231 may configure the processor 260 to trigger apparatus 200A to move the sensor assembly 120 and/or lens assembly 110, thereby approximately centering sensor assembly 120 on the optical axis 116 and at the focal plane 118 of the lens assembly 110. In another embodiment, processor 260 may issue commands for lens holder 210 and/or sensor assembly holder 220 to move lens assembly 110 and/or sensor assembly 120, respectively.

In yet another embodiment, a user of the apparatus 200A and device 200B may manually position the sensor assembly 120 and lens assembly 110 in approximate alignment. In this embodiment, the user may place the components in their respective holder and then attach the sensor assembly 120 onto the surface of rotational adjustor 222. Similarly, the user may place and securely fit the lens assembly into lens holder 210, via coupler 216.

After the sensor assembly is positioned relative to the lens assembly, the process 500 moves to block 520. At block 520 the process 500 directs light through an alignment optic and the lens assembly onto the sensor assembly. For example, light from light source 290 is passed through alignment optic 240, held by lens holder 210, along the optical axis of the lens assembly 110. The light from light source 290 is then focused, via lens assembly 110, on a focal plane within a thin three dimensional volume that may not be optimally positioned on the light sensitive surface of the image sensor 125. In this embodiment example the process described in FIG. 5 is intended to incrementally align the best focal plane within the three dimensional volume of the light sensitive surface of the image sensor 125. In some embodiments, the alignment optic is substantially similar to a multi-zone axicon flat top lens, as described above in reference to FIG. 3A-4D.

After the light is directed onto the sensor assembly 120, the process 500 continues to block 525, where the sensor assembly 120 is moved in the translational X and Y directions relative to the lens assembly 110. In some embodiments, the sensor assembly 120 can be moved such that the light sensitive surface of the image sensor 125 is approximately centered with the optical axis 116 of the lens assembly 110. The process for centering the light sensitive surface of image sensor 125 is further detailed below with reference to FIG. 9.

After completing the X and Y translation alignment of block 525 the process moves to block 530, at least one image is produced as a result of the light incident upon the image sensor, the image having multiple alignment features due to the alignment optic. The image may be a still or video captured by the capture control module and displayed on display 270. The image may be based on light incident on sensor assembly 120 having passed through alignment optic 240 and lens assembly 110.

The image includes multiple alignment features based on the light passing through the alignment optic. In some embodiments, the alignment optic is substantially similar to axicon 300 described above in reference to FIGS. 3A and 3B. Axicon 300 may segment the light, as described above in reference to FIGS. 4A-4D, into multiple concentric circles or rings. In some embodiments, axicon 300 segments the light into four concentric rings, having an inner most ring and multiple outer rings. Each ring may be made up of an infinite number of sections, which represent a location along the alignment feature where a performance indicator may be measured. The process 500 may select a subset of sections for each alignment feature from which to make performance measurements. In some embodiments, instructions included in feature determination module 233 may configure the processor 260 to resolve the multiple alignment features of an image and determine the sections, based, at least in part, on the image captured due to instructions from the capture control module 232.

After the alignment feature is resolved, the process 500 continues to block 540, where a performance indicator is measured corresponding to each of the measurement sections determined in block 530. The at least one performance indicator may be determined by the performance determination module 234 as described above in reference to FIGS. 4B-4D. In one embodiment, the performance indicator is a sharpness value for each of the sections of the alignment feature, indicative of the position of the sensor assembly relative to the lens assembly thin three dimensional focal surface. The sharpness value may be based on a LSF, PSF, SFR, MTF, or other direct or indirect ways of expressing similar concepts, and may be calculated in a manner similar to that described herein and above in reference to FIG. 4B-4D.

After the performance for each point is determined, the process 500 continues to block 550, where the position sensor assembly is adjusted by an optimization algorithm based on at least one performance indicator. Instructions included in optimization module 235 may configure the processor 260 to determine an alignment adjustment of the sensor assembly 120 and the lens assembly 110. The alignment adjustment may be configured to maximize and balance the performance indicators of each measurement section. An illustrative example of performance indicator optimization is depicted in FIGS. 6A-6B, and will be described in greater detail below.

In some embodiments, the translational X and Y position that are approximately perpendicular to the optical axis 116 may be adjusted to bring about centering the optical axis 116 with the center of the image surface of the image sensor 125, or vice versa. In one embodiment, the translational position X and Y of the sensor assembly relative to the optical axis 116 of the lens assembly may be based on centering the central dot 410b and/or the calculated center based on the concentric rings.

In another embodiment, the translational position in the Z direction along the optical axis 116 of the lens assembly 110 relative to the focal plane may be based on maximizing the performance (e.g., sharpness) of at least one section of the inner most ring. For example, optimization module 235 may receive performance information from performance determination module 234, and based on the performance indicators of the inner most ring, estimate the Z translational movement to increase the performance indicators of the same sections of the alignment features used to previously provide the performance indicator information to module 235 from module 234. This process can be repeated until the optimization algorithm in module 235 determines an optimized Z position has been found.

In another embodiment, the rotational position of the sensor relative to the focal plane of the lens assembly (e.g., pitch, yaw, and roll) may be based on balancing the performance of a single alignment feature, as illustrated in reference to FIGS. 6A and 6B. For example, the optimization module 235 may receive the sharpness values for all sections of a given alignment feature (e.g., concentric rings 420b, 430b, 440b and 450b of FIG. 4) from the performance determination module 234. The optimization module 235 may then use previously obtained sharpens values from performance determination module 234 to estimate the rotational and transitional adjustments that may increase and/or optimize the sharpness values across the entire light sensitive surface of image sensor 125. These adjustments can be applied to at least the translational Z direction and the rotational directions pitch, yaw and roll. The process may be repeated until the optimization module 235 determines optimal positions for the translational Z position and rotational positions pitch, yaw and roll. These optimized positions can then be provided to processor 260 which may be configured based on instructions received from optimization module 235 to position the light sensitive surface of the image sensor 125 in the center X and Y position and the optimal Z position along with the optimal pitch yaw and roll positions. In some embodiments, the attachment mechanism 250 can then be controlled or directed based on instructions from memory 240 to fasten the lens assembly 110 to the sensor assembly 120 while both are being held in the optimal position.

In another embodiment, the translational direction Z and rotational positions pitch, yaw and roll of the sensor assembly relative to the focal plane of the lens assembly may be based on balancing the performance of all points of the entire image, e.g., all alignment features. The balancing may be performed in a manner substantially similar to the balancing of all points in a single alignment feature. However, additional weighting may be applied to the sharpness values of different alignment features, for example, the outer most ring may be given the most weight to adjust tilt related to that specific concentric ring.

It should also be recognized that the embodiments presented herein are not limited to the specific embodiments of optimization algorithms or routines described here. The embodiments are intended to point out the factors or aspects that may be used to design such a system and the benefits, attributes and claims of the system being described herein.

After the position of the sensor assembly is adjusted, the process 500 continues to decision block 560. At decision block 560, a determination is made as to whether the optimal alignment of the sensor assembly and lens assembly has been reached or whether the system has reached some break point. In some embodiments, the determination may be based on statistical analysis of the performance indicators of the alignment features over a set of the most recent iterations of process 530 to process 550. For example, a mean and a standard deviation for the performance indicator of each section of the alignment features may be determined across a set of iterations from block 530 to 550. The means and standard deviations may be compared with a predetermine threshold for each of the performance indicators and, when the threshold is reached, decision block 560 may determine that the alignment process between lens assembly 110 and sensor assembly 120 is optimized. Then, the process 500 moves to block 570. In other embodiments, different algorithms may be used the enable some tolerance where some of the performance indicators may not reach a threshold while performance indicators do reach such thresholds. Other embodiments may also have more complicated functions to achieve the level of performance indicators.

In some embodiments, the preselected number of performance indicators may not reach the threshold within a predetermined number of iterations of process 530 to 550. In such instances, decision block 560 may decide to stop process 500 and report the alignment process as not successful. Block 570 may include a special process to handle this situation, for example, such as not assembling the lens and rejecting either or both the lens assembly 110 and/or sensor assembly 120.

If a determination is made that the optimal alignment has been reached, the process 500 continues to block 570, where the sensor assembly is attached to the lens assembly. In some embodiments, the optimization module 235 sends instructions to processor 260 to issue a command to attachment mechanism 250 to attach the sensor assembly 120 and lens assembly 110. In some embodiments, the lens assembly and sensor assembly are affixed (e.g., by a gluing process or other mechanical, magnetic, or electrical attachment mechanism) such that the optimal alignment configuration is held in place, thereby stabilizing the optical path of the light through the elements. After the lens assembly and sensor assembly are attached, the process 500 continues to an end block and the process is completed.

FIGS. 6A and 6B are illustrative graphical examples of optimizing the alignment of the optical system based on implementing process 500 of FIG. 5. FIG. 6A shows a three dimensional graph, where the vertical axis represents the PIS (e.g., a numerical Performance Indicator Scale) for the performance indicators for selected sections of the alignment features. In this embodiment, the PIS range from about 0.3 to just over 0.8. The base of the graph shows the row and column numbers of the pixels of the light sensitive surface of the image sensor 125, where the numbers are from zero to about 2000 rows on the height side and from zero to about 2500 columns on the width side.

On the surface 690a the locations of the sections of the alignment features (e.g., alignment feature 620a) used to provide performance indicators to optimization module 235 are shown as points 610a. The surface 690a can be considered a best fit surface for the performance indicator values provided to optimization module 235. The size of the half circle for each section (e.g., section 610a) indicates the difference of the performance indicator value and the surface 690a at that location. The dot and line connecting to a half circle for section 610a, if shown, indicates the performance indicator value at that location is higher than the best fit surface 690a. In instances where such dot and line is not visible, this is indicative that the performance indicator value is less than the performance value at that location on best fit surface 690a. The objective of methods and systems disclosed herein is to increase the performance indicator values of all the sections of the alignment features, e.g., the half circles and dot/line pairs, to be above a threshold value and to be uniform across the light sensitive surface of image sensor 125.

FIG. 6B illustrates a situation where the alignment between the image sensor and lens assembly may be considered optimized. FIG. 6B illustrates the optimization based on having optimized performance indicator values where values of all performance indicators have reached or exceeded a threshold and the best fit surface 690b estimated by, for example, optimization module 235, to fit within a narrow range of performance indicator values shown on the PIS scale. If the best fit surface 690b is within an acceptable narrow range of the PIS scale and is high enough to pass the contour requirements and the performance indicator requirements are achieved then the system may determine that the optimal alignment has been achieved. For example, with reference to FIG. 5, process 560 may decide the alignment has been successfully optimized and then move the process onto process block 570.

In some embodiments, the performance indicators, as described in reference to FIGS. 4B-4D, may be derived from linearized line segments or sections on the concentric rings 420b, 430b and 440b. Such a method of using concentric rings may result in optimal positioning of the lens assembly 110 with respect to the image sensor assembly 120. In some embodiments, the optimal position or alignment will provide optimal performance for Tangential MTF measurements and may have less than optimal performance for Sagittal MTF performance of the optical system 100. It may be possible to improve overall MTF performance of the optical system 100 by balancing both the Tangential and Sagittal MTF performance. In one embodiment, the optimal alignment may be determined using optical simulation software, such as Zemax®. For example, a linear Z axis shift may be implemented relative to the optimized Z axis position determined by the optimization module 235 after the optimal lens alignment has been successfully found using process 500 of FIG. 5. This Z axis shift may be configured to place the lens assembly 110 in a position with respect to the sensor assembly 120 to achieve an optimal balanced performance for both the sagittal and tangential MTF performance of the optical system 100.

FIG. 7 is a flowchart of an exemplary routine for actively aligning an optical system for optimum Tangential MTF performance, in accordance with an embodiment. Process 700 may be performed by alignment apparatus 200A, either independently or in conjunction, with data processing device 200B as illustrated in FIG. 2. In some embodiments, the method of for actively aligning a lens assembly 110 and sensor assembly 120 may be performed by the alignment apparatus 200A in communication with any one of the modules of memory 230. The method can be implemented as a software solution by the memory 230 or implemented elsewhere by data processing device 200B, for example one or more processors executed by a logic device in processor 260.

Process 700 beings at a start block and then moves to process block 710, where the process 700 initiates the alignment system. In one embodiment, an alignment system is started by the user of the devices seeking to assembly an optical system. The functions of process block 710 will be explained in further detail below with reference to FIG. 8.

After the alignment system is initiated, process 700 continues to block 720, where a counter is set. In some embodiments, the counter may be implemented to keep track of the alignment features by incrementing the counter after each alignment feature. In some embodiments, the counter increments after optimizing each concentric ring, e.g., a counter is set to consider the inner most ring and bypassing the central dot, as described above in reference to FIGS. 4A and 4B-4D, due to the intensity of the central dot would saturate measurements as a basis for alignment. In one embodiment, the counter is set to one where one represents the inner most ring. In another embodiment, the counter is set to two where two represents the second detected element, for example the central dot being a first element and the inner most ring being the second element. The number of alignment features may be received from the feature determination module 234 as a result of process block 710. After the counter is set, the process 700 continues to subprocess 730 for each of the alignment features.

For each of the alignment features, starting with the inner most feature, the process 700 proceeds to process block 732. At process block 731, the process adjusts the translational position of the sensor assembly based on the optimized sharpness value. The functions of process block 710 will be explained in further detail below with reference to FIG. 9. After the process 700 adjusts the translational position, the process continues to process block 732. At process block 732, the process adjusts the rotational position based on the optimized sharpness value of the current alignment feature. For example, where the counter is set to one, e.g., the inner most ring, the process adjusts the position based on optimizing the inner most ring. However, if the counter is set to two, e.g., the first outer ring, the process adjusts the position based on optimizing the second ring or first outer ring.

After the process 700 adjusts the rotational position based on the current alignment feature, the process continues to decision block 733. At decision block 733, a determination is made as to whether the optimal rotational alignment based on the current alignment feature has been reached or whether the system has reached some break point. The determination at decision block 733 may be substantially similar to decision block 560 described in reference to FIG. 5. If a determination is made that the optimal rotational alignment has not been reached, the process 700 returns to block 731 and repeats the translational adjustment of block 731 and rotational adjustment of block 732. If a determination is made that the optimal rotational alignment has been reached, the process 700 continues to process block 734. At process block 734, the process adjusts the rotational position based on the optimized sharpness value of all alignment features up to the current alignment feature. For example, where the counter is set to three, e.g., third ring or second outer ring, the process adjusts the position based on optimizing the sharpness value for all rings from the current, e.g., third ring, to the inner ring. In another embodiment, the process adjusts the rotational position based on the optimized sharpness value of all alignment features of the entire image, e.g., where the current alignment feature relates to the inner most ring the system may optimize the rotational position based on all alignment features not just up to the current alignment feature.

After the process 700 adjusts the rotational position based on all alignment features up to the current alignment feature, the process continues to decision block 735. At decision block 735, a determination is made as to whether the optimal rotational alignment based all alignment features up to the current alignment feature has been reached or whether the system has reached some break point. The determination at decision block 735 may be substantially similar to decision block 560 described in reference to FIG. 5. If a determination is made that the optimal rotational alignment has not been reached, the process 700 returns to block 731 and repeats the translational adjustment of block 731 and rotational adjustments of block 732 and 734. If a determination is made that the optimal rotational alignment has been reached, the process 700 continues to decision block 740.

At decision block 740, a determination is made as to whether the process has considered all N alignment features. In this respect, process 700 may utilize the counter of block 720 by incrementing the counter to keep track of each of the alignment features. If the counter is less than N, the decision block 740 continues to block 750. At block 750, the counter may be increased by an increment. In some embodiments, the increase may be an integer, e.g., 1, representing at least one of the alignment features. For example, the next concentric ring in an outward direction from the central dot, where each concentric ring represents at least one alignment feature. In this way, the method may increment the counter to keep track of the alignment features. Once the counter has been incremented, the process 700 may proceed to subprocess block 730 and repeat the process for the next alignment feature corresponding to the counter value, until the counter value equals N (the number of determined alignment features).

If the counter is equal to N, then the decision block 740 determines the all N alignment features have been considered and the apparatus 200A, in conjunction with device 200B, has optimally aligned the optical system 100. In this situation, the process 700 may continue to block 760, where the sensor assembly and lens assembly are attached. In some embodiments, the optimization module sends instructions to processor 260 to issue a command to attachment mechanism 250 to attach the sensor assembly 120 and lens assembly 110. In some embodiments, the lens assembly and sensor assembly are affixed (e.g., by a gluing process or other mechanical, magnetic, or electrical attachment mechanism) such that the optimal alignment configuration is held in place, thereby stabilizing the optical path of the light through the elements. Once the sensor assembly and lens assembly are attached, the process 700 may proceed to an end block and the active alignment process and attachment may be completed.

Figure 8:
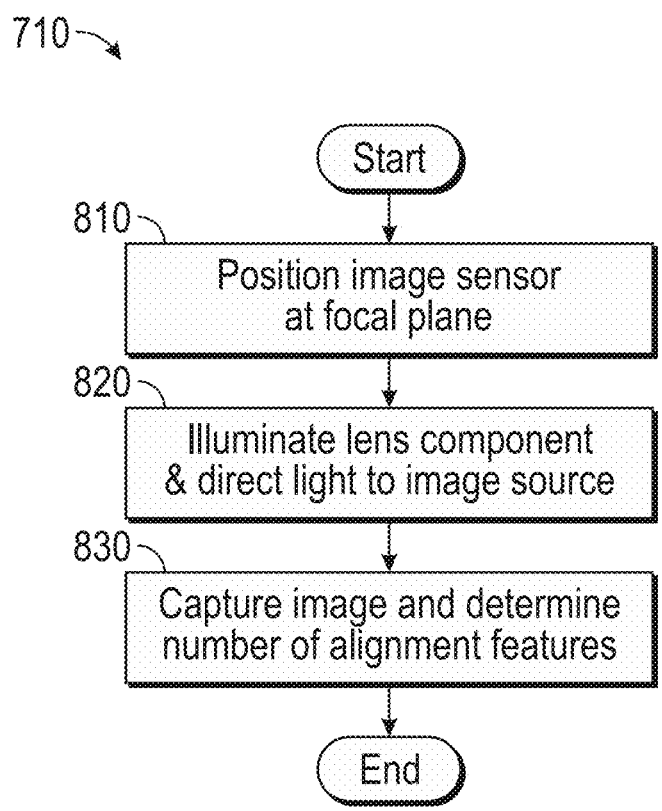
FIG. 8 is a flowchart of a method for initiating the method of FIG. 8 in accordance with an embodiment.

FIG. 8 is a flowchart of process 710 of initializing the active alignment system. The process begins at a start block and then proceeds to block 810, where the sensor assembly is positioned near the focal plane of the lens assembly. In some embodiments, the sensor assembly may be sensor assembly 120 having an image sensor 125 positioned near the focal plane of the lens assembly 110. In some embodiments, sensor assembly may or may not include sensor cover glass 122. In an illustrative embodiment, the sensor assembly is roughly positioned at the focal plane, thereby relying on the subsequent adjustments to finely tune the configuration of optical system 100. Instructions included in position control module 231 may configure the processor 260 to trigger apparatus 200A to move the sensor assembly 120 and/or lens assembly 110, thereby approximately centering sensor assembly 120 on the optical axis 116 and at the focal plane 118 of the lens assembly 110. In another embodiment, processor 260 may issue commands for lens holder 210 and/or sensor assembly holder 220 to move lens assembly 110 and/or sensor assembly 120, respectively.

In yet another embodiment, a user of the apparatus 200A and/or device 200B may manually position the sensor assembly and lens assembly in approximate alignment. In this embodiment, the user may place and then attach the sensor assembly onto the surface of rotational adjustor 222. Similarly, the user may place and securely fit the lens assembly into lens holder 210, via coupler 216.

After the sensor assembly is positioned relative to the lens assembly, the process 710 moves to block 820. At block 820 the process 800 directs light through an alignment optic and the lens assembly onto the sensor assembly. For example, light from light source 290 is passed through alignment optic 240, held by lens holder 210, along the optical axis of the lens assembly 110. The light from light source 290 is then approximately focused, via lens assembly 110, onto image sensor 125 of sensor assembly 120. In some embodiments, the alignment optic is substantially similar to a multi-zone axicon flat top lens, as described above in reference to FIGS. 3A-4D.

After the light is directed onto the sensor assembly, the process 710 continues to block 830. At block 830, an image is produced as a result of the light incident upon the image sensor and the number of alignment features is determined, as described above in reference to FIG. 4B-4D. The image may be a, still or video captured by the capture control module and displayed on display 270. The image may be based on light incident on the light sensitive surface of the image sensor 125 of assembly 120 having passed through alignment optic 240 and lens assembly 110. Instructions included in capture control module 232 may configure the processor 260 capture an image of the light incident on the light sensitive surface of the image sensor 125 of assembly 120 and store the image in working memory 280 and/or storage 285.

In some embodiments, the image includes multiple alignment features based on the light passing through the alignment optic. In some embodiments, the alignment optic is substantially similar to axicon 300 described above in reference to FIGS. 3A and 3B. Axicon 300 may segment the light, as described above in reference to FIGS. 4A and 4B-4D, into multiple concentric rings. In some embodiments, axicon 300 segments the light into four concentric rings, having an inner most right and multiple outer rings. In some embodiments, instructions included in feature detection module 233 may configure the processor 260 to determine the number of multiple alignment features and store the image in working memory 280 and/or storage 285.

After the number of alignment features is determined, the process 710 continues to an end block. The process 710, once completed, may return to process 700 and continue to block 720 as described above in reference to FIG. 7.

Figure 9:
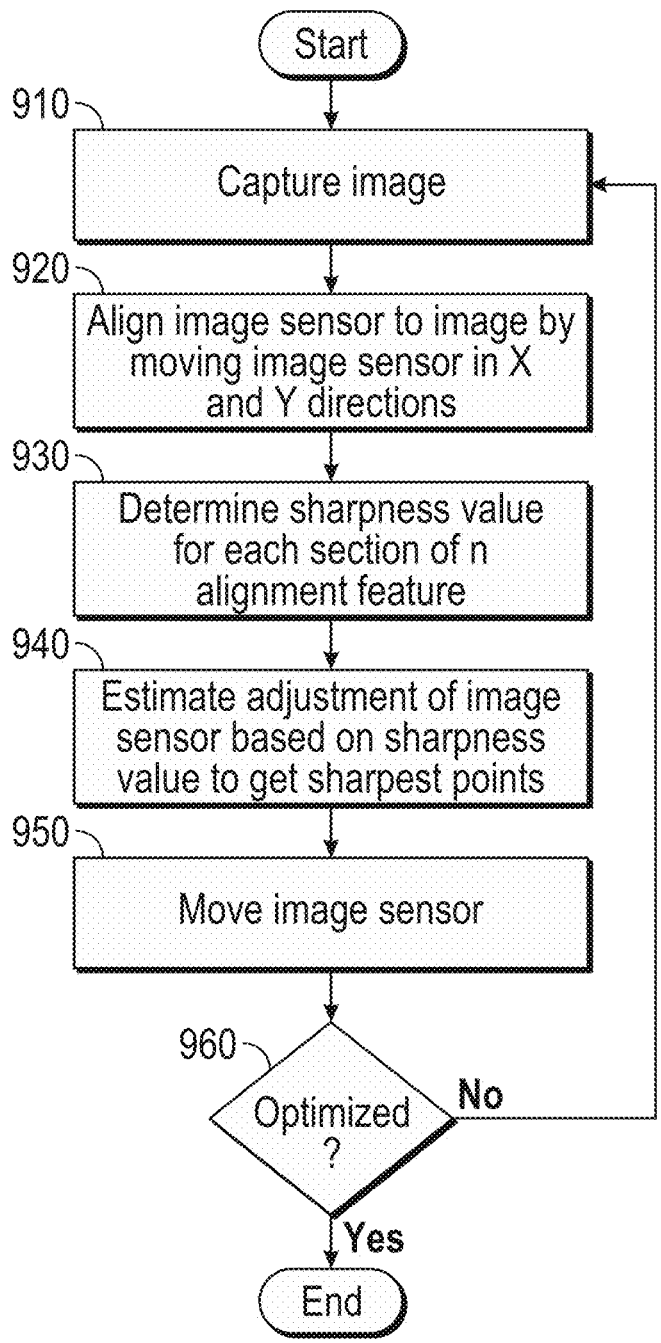
FIG. 9 is a flowchart of a method for aligning the optical system in the translational direction in accordance with an embodiment.

FIG. 9 is a flowchart of process 731 of adjusting the translational position of a sensor assembly based on optimized sharpness values. The process begins at a start block and then proceeds to block 910, where an image is captured. In some embodiments, a new image is produced during each iteration of process 700, each iteration being based on an adjusted optical system alignment. In other embodiments where the image is based on a video, the block 910 may capture one of the video frames related to the current iteration of the process 700.

After the image is captured, the process moves to block 920, where the sensor assembly is positioned along the optical axis of the lens assembly. In some embodiments, the center of the light sensitive surface of the image sensor 125 image surface is positioned on the optical axis 116 based on X and Y directional adjustments that are approximately perpendicular to the optical axis 116. In one embodiment, the translational position of the sensor assembly relative to the optical axis of the lens assembly may be based on centering the light sensitive surface of the image sensor 125 to the central dot and/or the calculated center of the concentric rings.

After the light sensitive surface of the image sensor 125 is positioned on the optical axis of the lens assembly, the process continues to block 930. At block 930, at least one performance indicator is determined for each section of the current alignment feature. The at least one performance indicator may be determined by the performance determination module 234 as described above in reference to FIG. 2. In one embodiment, the performance indicator is a sharpness value determined by methods similar to that described for FIG. 4B-4D. The sharpness value may be based on a LSF, PSF, SFR, MTF, or other direct or indirect ways of expressing similar concepts.

After the performance indicator is determined for each section, the process continues to block 940, where a position adjustment estimate is determined based on the sharpness values of the sections. In some embodiments, the position of the sensor assembly 120 may be adjusted based on an optimization algorithm of the sharpness value. In one embodiment, the translational position of the sensor assembly relative to the focal plane (e.g., the Z direction) may be based on maximizing the performance of the sections of the inner most alignment feature. For example, optimization module 235 may receive performance information from performance determination module 234, based on the performance indicators of the inner most ring. Module 235 may then estimate the translational movement along the Z axis that may increase the sharpness values of the inner most ring sections used to provide performance indicator information to module 235. In another embodiment, weighting may be applied to the adjustment amount to avoid overshooting the optimal alignment of optical system 100. The weight applied for each iteration need not be the same, and may be adjusted based on the determined error in the alignment.

After the adjustment is determined, the process continues to block 950, where the sensor assembly is moved relative to the lens assembly. In one embodiment, the position control module 231 includes instructions to configure the processor 260 to cause either the lens holder 210 or sensor assembly holder 220 to move the lens assembly or sensor assembly, respectively, based, at least in part, on adjust amount determined by the optimization module 235.

After the process moves the sensor assembly relative to the lens assembly, the process continues to decision block 960. At decision block 960, a determination is made as to whether the optimal translational alignment based on the current alignment feature has been reached or whether the system has reached some break point. The determination at decision block 960 may be substantially similar to decision block 560 described in reference to FIG. 5. If a determination is made that the optimal translational alignment has not been reached, the process returns to block 910 and repeats the process 731. If a determination is made that the optimal translational alignment has been reached, the process 731 continues to an end block. The process 731, once completed, may return to process 700 and continue to block 732 as described above in reference to FIG. 7.

Figure 10:
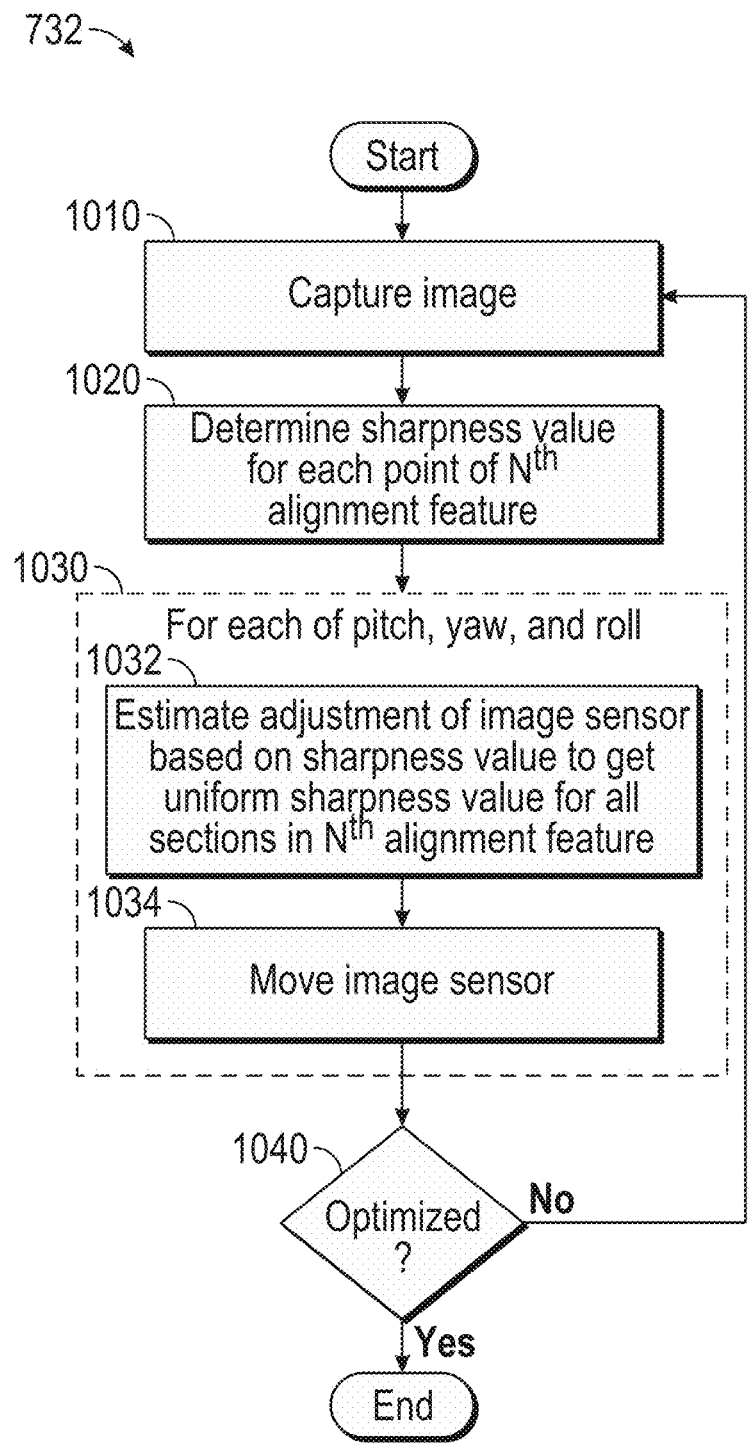
FIG. 10 is a flowchart of a method for aligning the optical system in at least one rotational direction based on an alignment feature in accordance with an embodiment.

FIG. 10 is a flowchart of process 732 of adjusting the rotational position based on the optimized sharpness value of the current alignment feature. Block 1010 may be substantially similar to block 910 described in reference to FIG. 9. After the image is captured, the process continues to block 1020. At block 1020, at least one performance indicator is determined for each section of the current alignment feature. Block 1020 may be substantially similar to block 930 described in reference to FIG. 9. After the performance indicators are determined, the process 732 continues to subprocess 1030 for each rotational direction (e.g., pitch, yaw, and roll). In one embodiment, subprocess 1030 may be performed for at least two directions in a single iteration (e.g., pitch and yaw), while the other direction (e.g., roll) may be optimized in a subsequent iteration. In another embodiment, each rotational direction may be optimized individually in separate iterations of subprocess 1030.

For each rotational direction, the process continues to block 1032, where a position adjustment estimate is determined based on balancing the sharpness values for all sections of the current alignment feature. For example, the optimization module 235 may receive the sharpness value for all sections in an image, and determine the least mean square of the sharpness values. Based on the least mean square, the optimization module 235 may estimate the adjustment in at least one of the rotational directions (e.g., pitch, yaw, or roll), such that the sharpness values of the sections are uniform based on the least mean square. In another embodiment, the balancing of the sections of the alignment feature may be based on the sharpness values of at least two sections, one having the maximum detected value and the other having the lowest detected value, and estimating the adjustment to balance the two sharpness values such that both sections have substantially similar sharpness values. In another embodiment, the optimization module 235, or position control module 231, may apply a weight to the determined position adjustment to avoid overshooting the optimal alignment of optical system 100. The weight applied for each iteration need not be the same, and may be adjusted based on the determined error in the alignment.

After the adjustment amount is determined, the process continues to block 1034, where the sensor assembly is moved relative to the lens assembly. In one embodiment, the position control module 231 includes instructions to configure the processor 260 to cause either the lens holder 210 or sensor assembly holder 220 to move the lens assembly or sensor assembly, respectively, based, at least in part, on adjust amount determined by the optimization module 235.

After the process moves the sensor assembly relative to the lens assembly, the process continues to decision block 1040. At decision block 1040, a determination is made as to whether the optimal rotational alignment based on the current alignment feature has been reached or whether the system has reached some break point. The determination at decision block 1040 may be substantially similar to decision block 560 described in reference to FIG. 5. If a determination is made that the optimal rotational alignment has not been reached, the process returns to block 1010 and repeats the process 732. If a determination is made that the optimal rotational alignment has been reached, the process 732 continues to an end block. The process 732, once completed, may return to process 700 and continue to block 733 as described above in reference to FIG. 7.

Figure 11:
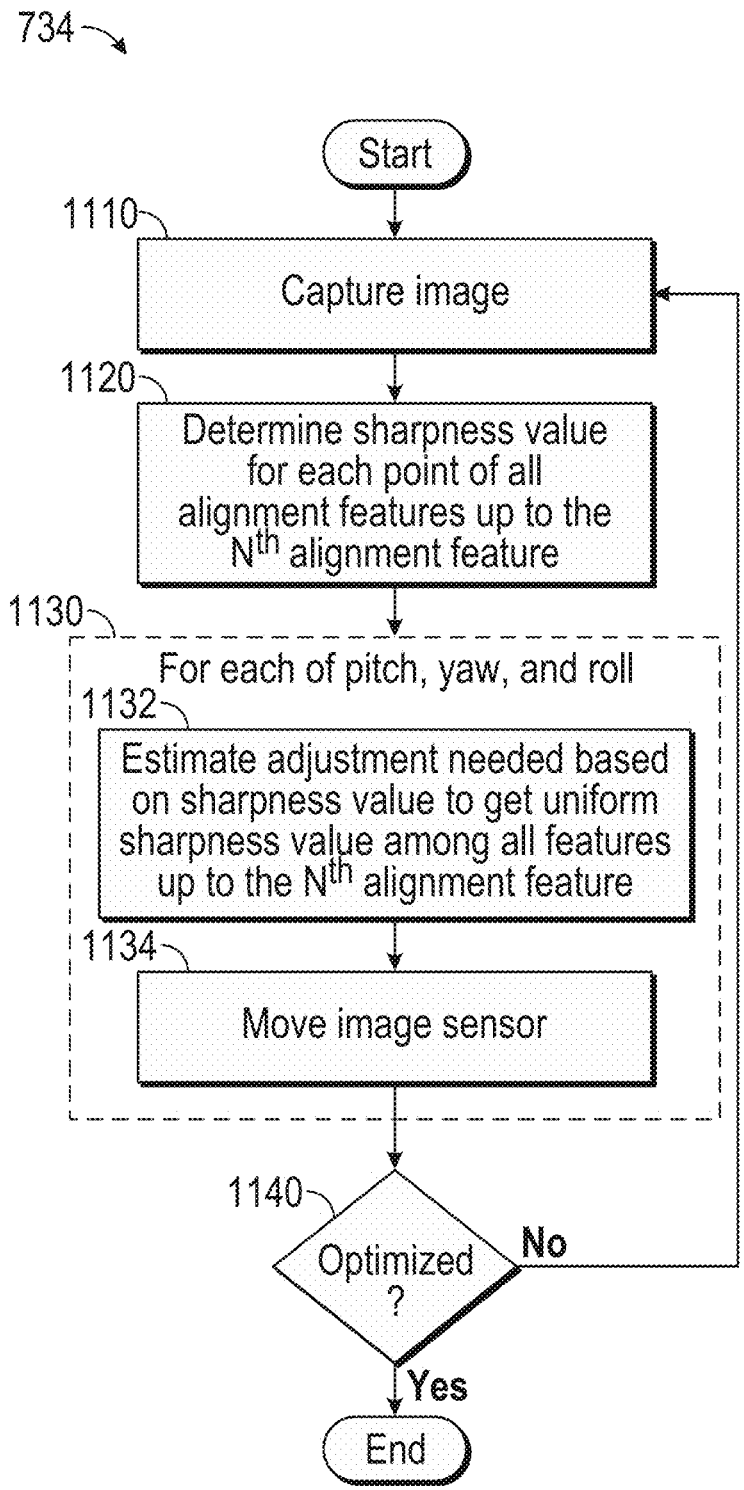
FIG. 11 is a flowchart of a method for aligning the optical system in at least one rotational direction based on all alignment features in accordance with an embodiment.

FIG. 11 is a flowchart of process 734 of adjusting the rotational position based on the optimized sharpness value of all alignment features up to the current alignment feature. In another embodiment, process 734 may adjust the rotational position of the sensor assembly based on the optimized sharpness value of all alignment features of an image, not to be limited by the current alignment feature. In this situation, the following descriptions remain similar, however consideration is given to the all alignment feature of an image.

The process begins at a start block and continues to block 1110. Block 1110 may be substantially similar to block 910 described in reference to FIG. 9. After the image is captured, the process continues to block 1120. At block 1120, at least one performance indicator is determined for each section of the current alignment feature. Block 1120 may be substantially similar to block 930 described in reference to FIG. 9. After the performance indicators are determined, the process 734 continues to subprocess 1130 for each rotational direction (e.g., pitch, yaw, and roll). In one embodiment, subprocess 1130 may be performed for the two directions in a single iteration (e.g., pitch and yaw), while the other direction (e.g., roll) may be optimized in a subsequent iteration. In another embodiment, each rotational direction may be optimized individually in separate iterations of subprocess 1130.

For each rotational direction, the process continues to block 1132, where a position adjustment is determined based on balancing the performance for all sections of the all alignment features up to the current alignment feature. The balancing may be performed in a manner substantially similar to the balancing of all points for the current alignment feature as described in block 1032 in FIG. 10, but include all sections of all alignment features up to the current alignment feature. However, additional weighting may be applied to the different alignment features, for example, the outer most ring may be given the most weight to adjust tilt related to that ring.

After the adjustment amount is determined, the process continues to block 1134, where the sensor assembly is moved relative to the lens assembly. In one embodiment, the position control module 231 includes instructions to configure the processor 260 to cause either the lens holder 210 or sensor assembly holder 220 to move the lens assembly or sensor assembly, respectively, based, at least in part, on adjust amount determined by the optimization module 235.

After the process moves the sensor assembly relative to the lens assembly, the process continues to decision block 1140. At decision block 1140, a determination is made as to whether the optimal rotational alignment based on the current alignment feature has been reached. The determination at decision block 1140 may be substantially similar to decision block 560 described in reference to FIG. 5. If a determination is made that the optimal rotational alignment has not been reached, the process returns to block 1110 and repeats the process 734. If a determination is made that the optimal rotational alignment has been reached, the process 734 continues to an end block. The process 734, once completed, may return to process 700 and continue to block 735 as described above in reference to FIG. 7.

In an illustrative embodiment, when the alignment features are optimally uniformly sharp, this may represent the best alignment for Tangential MTF performance of the optical system. In some embodiments, a subsequent adjustment is made to produce the best balanced performance between the Tangential MTF and the Sagittal MTF performance.

In one embodiment, the lens assembly can be individually measured for Tangential MTF and Sagittal MTF performance without using the sensor assembly that will be glued. This may provide a basis for determining an offset value to be applied to the sensor assembly 120 and or the lens assembly 110. Alternatively, a simulated design difference between the Tangential MTF and Sagittal MTF performance can be used to determine an offset from the optimum Tangential MTF alignment to be applied to the sensor assembly. Once the optimum alignment for Tangential MTF performance is located, based on the above methods in reference to FIGS. 5 and 7, the offsets may be applied to the sensor assembly 120 and or the lens assembly 110 position will be the best that should provide a more balanced Tangential MTF and Sagittal MTF performance.

Implementations disclosed herein provide systems, methods and apparatus for actively and optimally aligning an optical system during assembly. One skilled in the art will recognize that these embodiments may be implemented in hardware, software, firmware, or any combination thereof.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for aligning an optical system during assembly, the optical system having at least a lens assembly and a sensor assembly, the method comprising:

positioning a sensor assembly at the focal plane of a lens assembly, the sensor assembly including an image sensor;

directing light through an alignment optic and lens assembly onto the image sensor;

producing a plurality of images from the light received through the lens assembly and alignment optic, the images having a plurality of concentric alignment features based on the light received through the alignment optic, and each concentric alignment feature having a plurality of sections;

measuring at least one performance indicator corresponding to each of the plurality of sections; and adjusting the position of the image sensor, based on an optimization of the at least one performance indicator of a first section of a first concentric alignment feature relative to the at least one performance indicator of a second section of the first concentric alignment feature, while the sensor assembly is being attached to the lens assembly.

2. The method of claim 1, wherein the sensor assembly includes the image sensor and a sensor cover, and at least one surface of the lens assembly is attached to the sensor cover.

3. The method of claim 1, wherein the performance indicator is a sharpness value corresponding to the intensity of the light along the sections of the concentric alignment features detected by a portion of the image sensor.

4. The method of claim 1, wherein the light directed through the lens assembly and alignment optic is collimated light.

5. The method claim 1, wherein the alignment optic is a multi-zone flat top axicon lens.

6. The method of claim 1, wherein light directed through the alignment optic is segmented by the alignment optic into concentric alignment features depicted as a plurality of concentric rings, wherein each concentric alignment feature corresponds to at least one ring of the plurality of concentric rings.

7. The method of claim 6, wherein the plurality of concentric rings includes at least a first concentric ring and at least a second concentric ring, wherein the first concentric ring has a radius that is smaller than the second concentric ring.

8. The method of claim 7, wherein the performance indicators corresponding to sections of the first concentric ring relate to the translational position of the sensor assembly along the optical axis.

9. The method of claim 7, wherein the performance indicators corresponding to sections of at least one concentric ring relate to the rotational position of the image sensor in relation to the focal plane of the lens assembly.

10. The method of claim 1, wherein each of the plurality of images corresponds to a different position of the image sensor relative to the lens assembly.

11. The method of claim 1, wherein said adjusting the sensor assembly further comprises, maximizing the at least one performance indicator based on a translational position adjustment of the sensor assembly, wherein the performance indicator is maximized when the performance indicator of all sections of at least one concentric alignment feature are at a maximum.

12. The method of claim 1, wherein said adjusting the sensor assembly further comprises, balancing the at least one performance indicator based on the rotational position adjustment of the sensor assembly, wherein the performance indicator is balanced when the at least one performance indicator of the first section of the first concentric alignment feature is substantially similar to the at least one performance indicator of the second section of the same alignment feature.

13. The method of claim 1, wherein said adjusting the sensor assembly further comprises, optimizing the at least one performance indicator based on the rotational position adjustment of the sensor assembly, wherein the at least one performance indicator is optimized when the at least one performance indicator of the first section of the first concentric alignment feature is substantially similar to the performance indicator of the sections of the concentric alignment features positioned within the first alignment feature, and vice versa.

14. A device for aligning an optical system, having a lens assembly and a sensor assembly, during attachment, comprising:
  a lens assembly holder, configured to move the lens assembly and support an alignment optic, wherein the alignment optic is orientated along the optical axis of the lens assembly;
  a sensor assembly holder, configured to move the sensor assembly, the sensor assembly having an image sensor;
  an attachment mechanism, configured to attach the lens assembly to the sensor assembly when substantially aligned with respect to each other;
  a light source, configured to direct light through the alignment optic and lens assembly onto the image sensor;
  a processor, operably coupled to the lens assembly holder and sensor assembly holder; and
  a memory component, operably coupled to the processor, the processor and the memory component collectively configured to:
    capture a plurality of images from the light received by the sensor assembly through the lens assembly and alignment optic;
    determine a plurality of concentric alignment features of the plurality of images based on the light received through the alignment optic;
    determine a plurality of substantially linear sections for each concentric alignment feature;
    measure at least one performance indicator corresponding to each of the plurality of substantially linear sections; and
    determine an adjustment of the sensor assembly, relative to the lens assembly, based on optimizing the at least one performance indicators of a first linear section of a first concentric alignment feature relative to the at least one performance indicator of a second section of the first concentric alignment feature.

15. The device of claim 14, wherein the sensor assembly includes the image sensor and a sensor cover and at least one surface of the lens assembly is attached to the sensor cover.

16. The device of claim 14, wherein the performance indicator is a sharpness value corresponding to the intensity of the light along the substantially linear sections of the concentric alignment features detected by a portion of the image sensor.

17. The device of claim 14, wherein the light directed through the lens assembly and alignment optic is collimated light.

18. The device claim 14, wherein the alignment optic is a multi-zone flat top axicon lens.

19. The device claim 14, wherein the light is segmented by the alignment optic into concentric alignment features depicted as a plurality of concentric rings, wherein each concentric alignment feature corresponds to at least one ring of the plurality of concentric rings.

20. The device of claim 19, wherein the plurality of concentric rings includes at least an first concentric ring and at least a second concentric ring, wherein the first concentric ring has a radius that is smaller than the second concentric ring.

21. The device of claim 20, wherein the performance indicators corresponding to substantially linear sections of the first concentric ring relate to the translational position of the sensor assembly along the optical axis.

22. The device of claim 20, wherein the performance indicators corresponding to substantially linear sections of at least one concentric ring relate to the rotational position of the image sensor in relation to the focal plane of the lens assembly.

23. The device claim 14, wherein each of the plurality of images corresponds to a different position of the image sensor relative to the lens assembly.

24. The device of claim 14, wherein the sensor assembly holder is further configured to:
adjust the position of the sensor assembly; and
maximize the at least one performance indicator based on a translational position adjustment of the sensor assembly, wherein the performance indicator is maximized when the performance indicator of all substantially linear sections of the at least one concentric alignment feature are at a maximum.

25. The device of claim 14, wherein the sensor assembly holder is further configured to:
adjust the position of the sensor assembly; and
balance the at least one performance indicator based on the rotational position adjustment of the sensor assembly, wherein the performance indicator is balanced when the at least one performance indicator of the first substantially linear section of the first concentric alignment feature is substantially similar to the at least one performance indicator of the second substantially linear section of the same alignment feature.

26. The device of claim 14, wherein the sensor assembly holder is further configured to:
adjust the position of the sensor assembly; and
optimize the at least one performance indicator based on the rotational position adjustment of the sensor assembly, wherein the at least one performance indicator is optimized when the at least one performance indicator of the first substantially linear section of the first concentric alignment feature is substantially similar to the performance indicators of the plurality of substantially linear sections of the concentric alignment features positioned within the first concentric alignment feature, and vice versa.

27. A device for aligning an optical system, having a lens assembly and a sensor assembly, during attachment, comprising:
a means for capturing a plurality of images from the light received by the sensor assembly through the lens assembly and alignment optic;
a means for detecting a plurality of concentric alignment features of the plurality of images based on the light received through the alignment optic;
a means for determining a plurality of substantially linear sections for each concentric alignment feature;
a means for measuring at least one performance indicator corresponding to each of the plurality of substantially linear sections; and
a means for determining an adjustment of the sensor assembly, relative to the lens assembly, based on an optimization of the at least one performance indicator of a first section of a first concentric alignment feature relative to the at least one performance indicator of a second section of the first concentric alignment feature, while the sensor assembly is being attached to the lens assembly.

28. A non-transitory computer readable medium comprising instructions that when executed cause a processor to perform a method of actively aligning an optical system, having a lens assembly and a sensor assembly, the method comprising:
positioning the sensor assembly, having at least an image sensor, at the focal plane of the lens assembly;
directing light through an alignment optic and lens assembly onto the image sensor;
producing a plurality of images from the light received through the lens assembly and alignment optic, the images having a plurality of concentric alignment features based on the light received through the alignment optic, and the concentric alignment features having a plurality of sections;
measuring at least one performance indicator corresponding to each of the plurality of sections; and
adjusting the position of the image sensor based on an optimization of the performance indicator of a first section of a first concentric alignment feature relative to the at least one performance indicator of a second section of the first concentric alignment feature, while the sensor assembly is being attached to the lens assembly.

29. The non-transitory computer readable medium of claim 28, wherein the method further comprising wherein each of the plurality of images corresponds to a different position of the image sensor relative to the lens assembly.

* * * * *